US012785827B2

(12) United States Patent
Zhang et al.

(10) Patent No.: US 12,785,827 B2
(45) Date of Patent: Nov. 3, 2026

(54) CROSS-LINK INTERFERENCE INTER-SUBBAND MEASUREMENT

(71) Applicant: QUALCOMM Incorporated, San Diego, CA (US)

(72) Inventors: Qian Zhang, Basking Ridge, NJ (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 18/587,580

(22) Filed: Feb. 26, 2024

(65) Prior Publication Data

US 2025/0274205 A1 Aug. 28, 2025

(51) Int. Cl.
*H04B 17/345* (2015.01)
*H04B 17/318* (2015.01)
*H04L 5/00* (2006.01)

(52) U.S. Cl.
CPC ......... *H04B 17/345* (2015.01); *H04B 17/318* (2015.01); *H04L 5/0048* (2013.01)

(58) Field of Classification Search
None
See application file for complete search history.

(56) References Cited

U.S. PATENT DOCUMENTS

2024/0283603 A1* 8/2024 Awadin ................. H04L 5/0001
2025/0226868 A1* 7/2025 Fu ......................... H04L 5/0048
2025/0226898 A1* 7/2025 Xiong ................... H04L 27/261
2025/0247732 A1* 7/2025 Ardah ........................ H04L 5/14
2025/0365122 A1* 11/2025 Jung .................... H04B 17/345

FOREIGN PATENT DOCUMENTS

WO 2023212018 A1 11/2023
WO WO-2025134156 A1 * 6/2025 ........... H04L 5/0057

OTHER PUBLICATIONS

Qualcomm Incorporated: "On Potential Enhancements on Dynamic/ Flexible TDD", 3GPP TSG RAN WG1, Meeting #112bis-e, R1-2303590, 3rd Generation Partnership Project, Mobile Competence Centre, 650, Route Des Lucioles, F-06921 Sophia-Antipolis Cedex, France, vol. 3GPP RAN 1, No. Online, Apr. 17, 2023-Apr. 26, 2023, Apr. 7, 2023, XP052294150, 42 pages, paragraph [5.5.1].

(Continued)

*Primary Examiner* — Angela Nguyen
(74) *Attorney, Agent, or Firm* — Patterson & Sheridan LLP

(57) ABSTRACT

Certain aspects of the present disclosure provide method for wireless communications at a first network entity, generally including obtaining a configuration indicating subband-based reference signal (RS) resources, measuring, within at least one downlink subband or at least one uplink subband in at least one subband full duplex (SBFD) symbol, at least one of a cross link interference (CLI) caused by a second network entity or a channel between the first and second network entities, wherein the measurement is based on at least one RS of the RS resources indicated in the configuration, and performing one or more actions after measuring the CLI or the channel.

40 Claims, 25 Drawing Sheets

(56) References Cited

OTHER PUBLICATIONS

Xiaomi: "Discussion on Potential Enhancements on Dynamic/Flexible TDD", R1-2302983, 3GPP TSG RAN WG1 #112bis-e, e-Meeting, Apr. 17-Apr. 26, 2023, pp. 1-11.

International Search Report and Written Opinion—PCT/US2025/014072—ISA/EPO—May 12, 2025.

Qualcomm Incorporated: "Feasibility and Techniques for Subband Non-Overlapping Full Duplex", 3GPP Draft, 3GPP TSG RAN WG1, Meeting #113, R1-2305335, 3rd Generation Partnership Project, Mobile Competence Centre, 650, Route Des Lucioles, F-06921 Sophia-Antipolis Cedex, France, vol. 3GPP RAN 1, No. Incheon, Korea, May 22, 2023-May 26, 2023, May 14, 2023, XP052376413, 68 pages, sections 2, 3.

Spreadtrum Communications: "Discussion on Subband Non-Overlapping Full Duplex", 3GPP Draft, 3GPP TSG RAN WG1 #109-e, R1-2203328, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, XP052152923, 8 pages, section 2.

* cited by examiner

800

| gNB | UE | Comments |
| --- | --- | --- |
| FD Disabled | FD Disabled | Baseline Operation |
| FD Disabled | FD Enabled | Use Case 1 for mTRP |
| FD Enabled | FD Disabled | Use Case 2 and IAB |
| FD Enabled | FD Enabled | Use Case 3 |

FIG. 8

CROSS-LINK INTERFERENCE INTER-SUBBAND MEASUREMENT

FIELD OF THE DISCLOSURE

Aspects of the present disclosure relate to wireless communications, and more particularly, to techniques for subband full duplex (SBFD) wireless communications.

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a first network entity. The method includes obtaining a configuration indicating subband-based reference signal (RS) resources; measuring, within at least one downlink subband or at least one uplink subband in at least one subband full duplex (SBFD) symbol, at least one of a cross link interference (CLI) caused by a second network entity or a channel between the first and second network entities, wherein the measurement is based on at least one RS of the RS resources indicated in the configuration; and performing one or more actions after measuring the CLI or the channel.

Another aspect provides a method for wireless communications at a second network entity. The method includes obtaining a configuration indicating subband-based reference signal (RS) resources; outputting, within at least one downlink subband or at least one uplink subband in at least one subband full duplex (SBFD) symbol, at least one RS on the RS resources indicated by the configuration; and obtaining, from a first network entity, a report that indicates at least one of a cross link interference (CLI) based on measurement of the at least one RS at the first network entity, or channel measurement based on measurement of the at least one RS at the first network entity.

Other aspects provide: an apparatus operable, configured, or otherwise adapted to perform any one or more of the aforementioned methods and/or those described elsewhere herein; a non-transitory, computer-readable media comprising instructions that, when executed (e.g., directly, indirectly, after pre-processing, without pre-processing) by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 5-8 depict different use cases for full-duplex (FD) communications.

DETAILED DESCRIPTION

Figure 1:
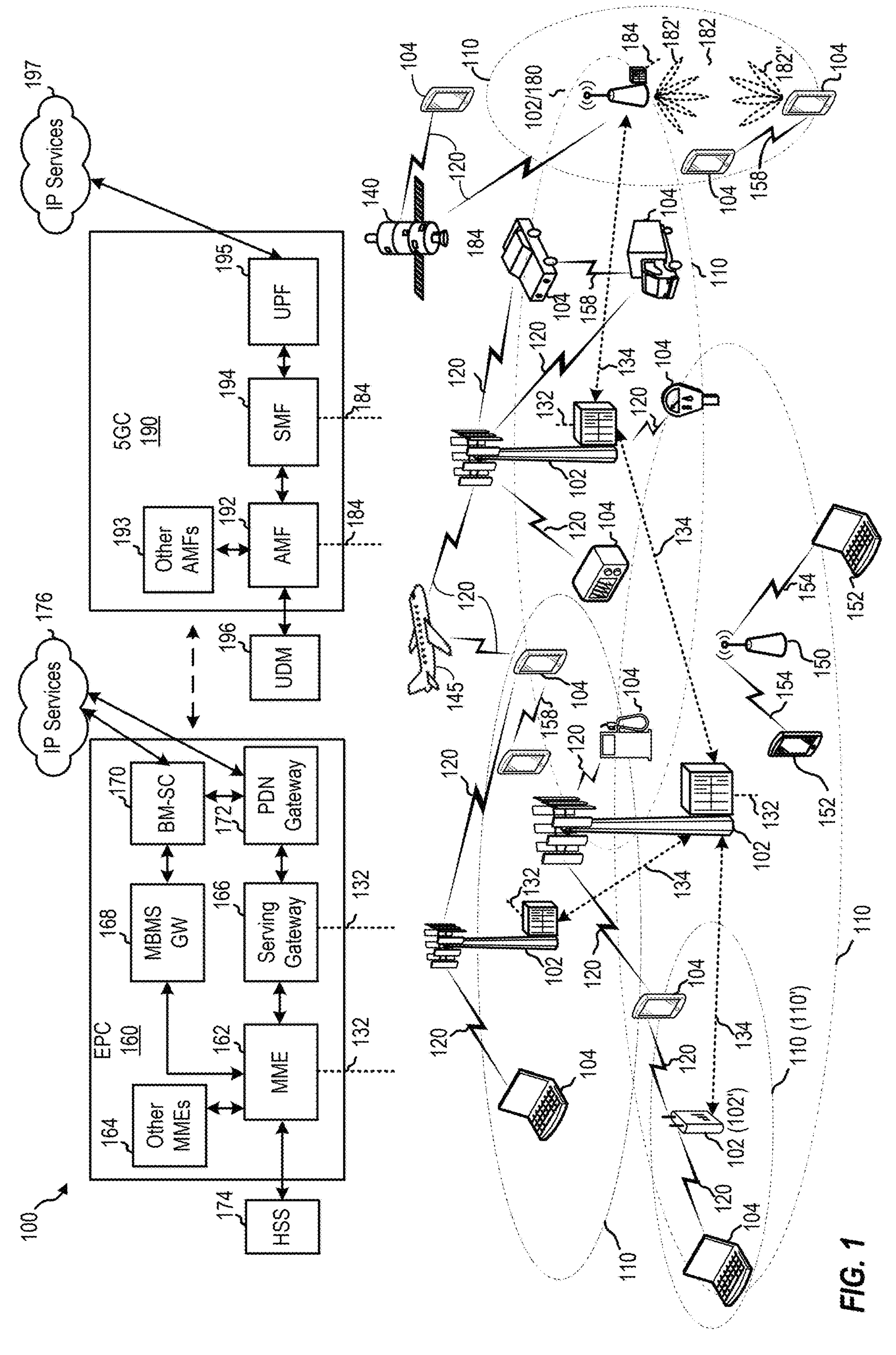
FIG. 1 depicts an example wireless communications network.

Aspects of the present disclosure relate to wireless communications, and more particularly, to techniques for subband full duplex (SBFD) wireless communications.

Half duplex (HD) communication generally refers to a mode of communication where a device only transmits or receives over a single communication channel, but does not simultaneously transmit and receive. In a system utilizing a time division duplex (TDD) carrier, different transmission time intervals (e.g., symbols or slots) may be configured as uplink, downlink, or flexible (which could be dynamically indicated as uplink or downlink via a slot format indicator-SFI).

Full duplex (FD) communication generally refers to a mode of communication where signals can be transmitted and received simultaneously over a single communication channel. In an FD mode, simultaneous transmission by wireless nodes, such as a user equipment (UE) and a base station (BS), may occur. Sub-band full duplex (SBFD) generally refers to a mode where a time division duplex (TDD) carrier is split into uplink and downlink sub-bands to enable simultaneous transmission and reception (on different subbands) in a same slot that consists of multiple symbols.

Cross-link interference (CLI) refers to a phenomenon that occurs in wireless communication systems, particularly in cellular networks, where interference is caused between UEs. For example, CLI may be caused between UE in a same cell (e.g., intra-cell CLI) or different cells (e.g., inter-cell CLI). CLI typically arises when the transmission signals from one UE interfere with the reception signals of another neighboring UE. In other words, when UEs that neighbor each other communicate, CLI may be caused by the neighboring UEs (e.g., and/or network entities cells that serve the neighboring UEs) performing/scheduling uplink and downlink communications on the same frequency resources at the same time.

To manage CLI, some systems configure certain resources (CLI resources) for one UE (referred to as an aggressor UE) to transmit reference signals (RSs) while another UE (referred to as a victim UE) measures the RSs. The aggressor UE may transmit (RS on) different CLI resources using different transmit beams.

CLI may also be caused between neighboring network entities. For example, inter-gNB CLI may occur between an aggressor gNB and a victim gNB. Solutions for inter-gNB CLI mitigation may be an important focus, particularly with subband non-overlapping full duplex scenarios and partial or fully overlapping full duplex scenarios. The potential variation in SBFD subband configurations may present a challenge to CLI mitigation solutions.

Aspects of the present disclosure, however, provide subband-based CLI-RS resource configurations that may help address the challenge of inter-gNB CLI mitigation in SBFD scenarios. In some cases, rules may be provided that help support inter-gNB CLI mitigation. As an example, a rule may allow an aggressor gNB to transmit CLI-RS on uplink subbands, which would normally be reserved for a gNB to receive on only. As another example, a rule may allow a victim gNB to measure CLI-RS on downlink subbands, which would normally be reserved for a gNB to transmit on only.

The subband-based CLI-RS resource configurations proposed herein may enable gNB-to-gNB co-channel CLI measurement and/or channel measurement via CLI-RS measured on SBFD symbols. For example, the subband-based CLI-RS resource configurations proposed herein may allow a victim gNB (which may also be referred to as a measurement gNB) to measure a metric (e.g., received signal strength indicator-RSSI) within n UL subband (for leakage), and/or to measure CLI-RS received power (CLI-RSRP) or CLI-RSSI within a downlink subband (for in-band blocking).

Based on inter gNB CLI measurement and/or reporting, network entities (e.g., victim and/or aggressor gNBs) may perform one or more actions in order to mitigate CLI between the neighboring UEs. Utilization of the techniques disclosed herein may provide significant advantages for CLI mitigation, reducing CLI and improving throughput and reliability of communications in wireless networks.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
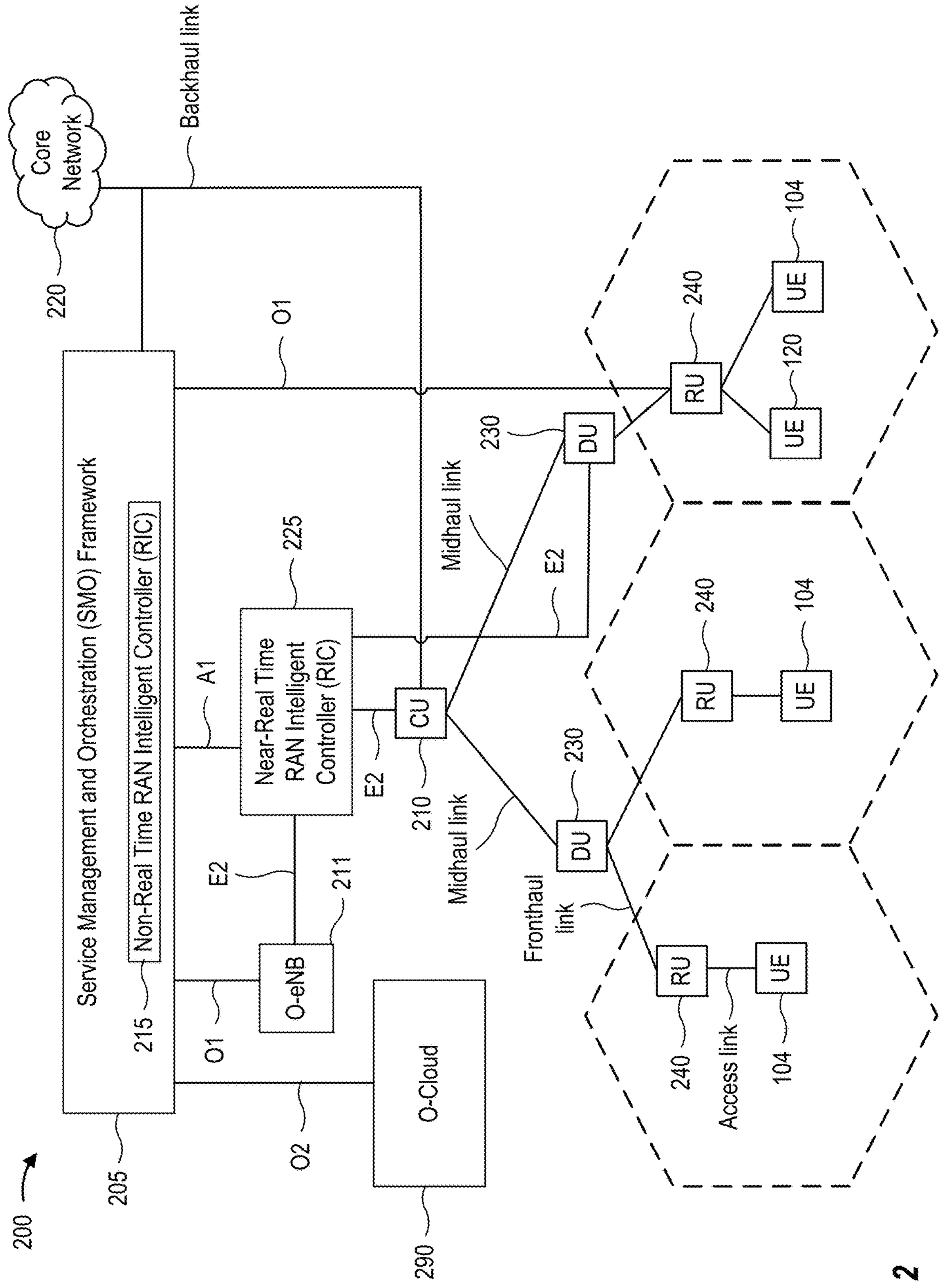
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHZ, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
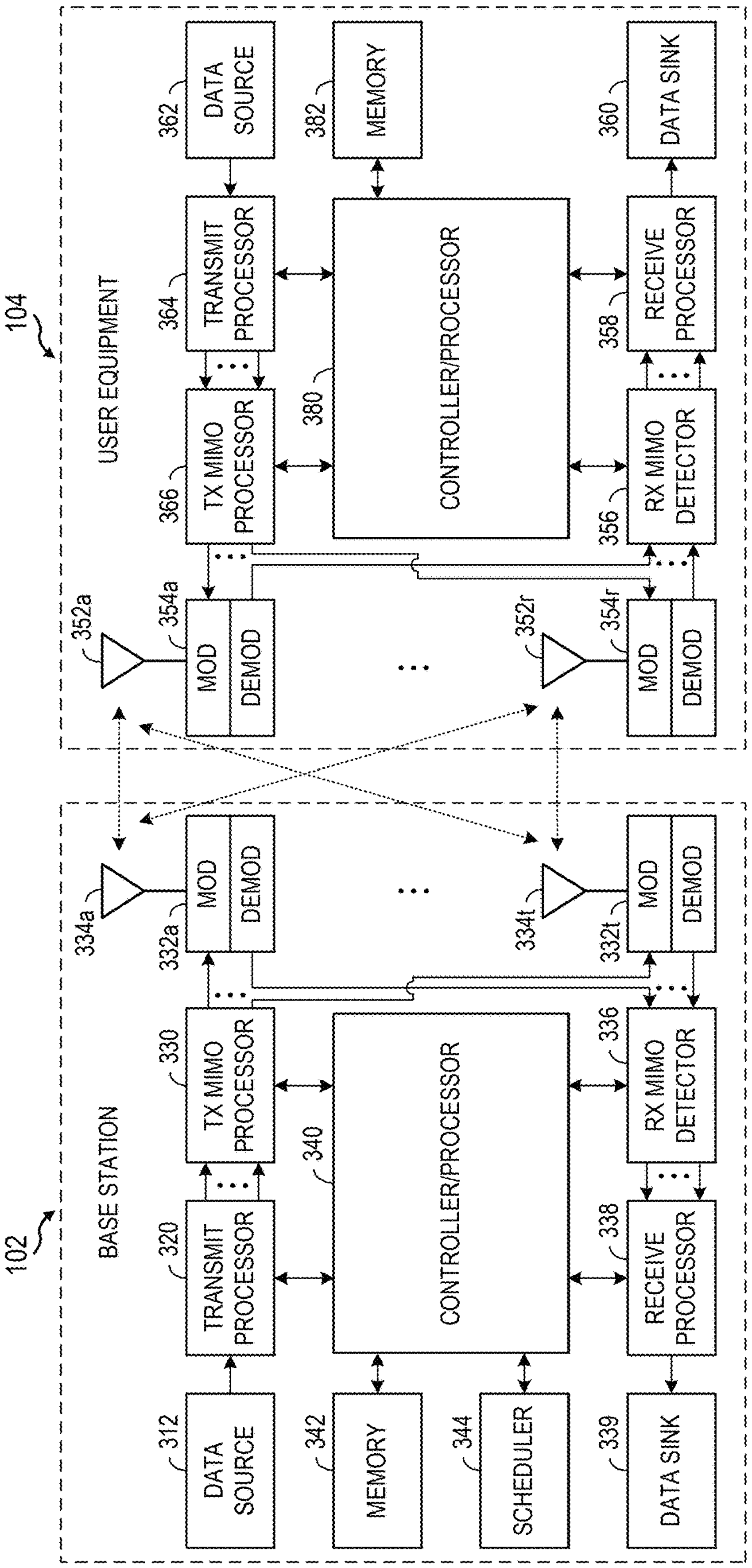
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, one or more processors may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4B:
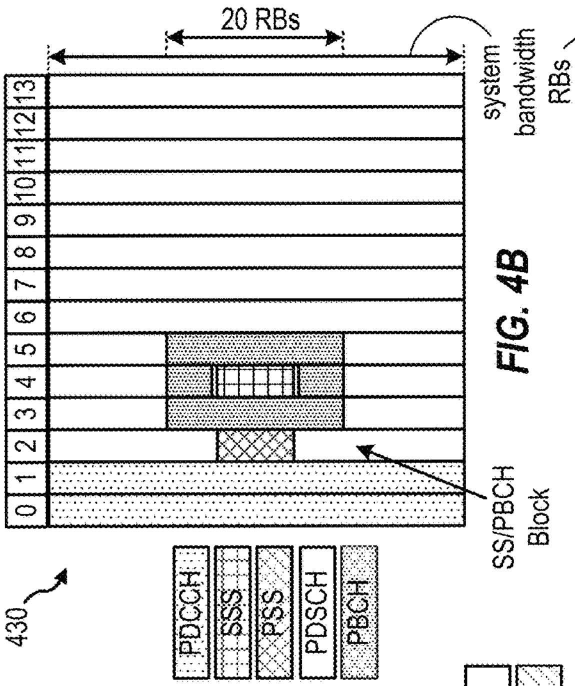
FIGS. 4A, 4B, 4C, and 4D depict various example aspects of data structures for a wireless communications network.
Figure 4A:
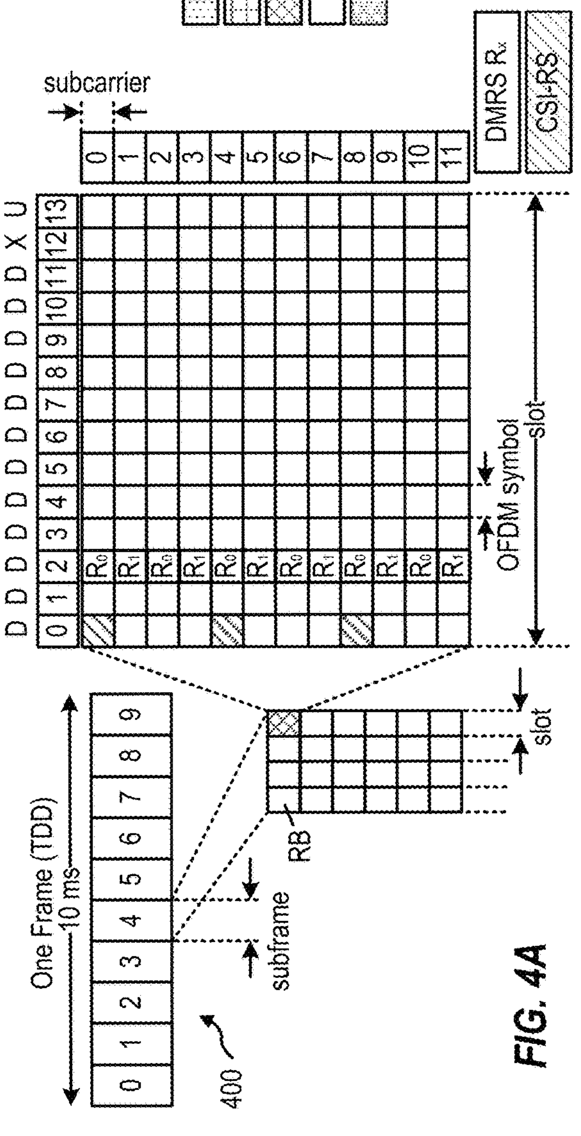
Figure 4D:
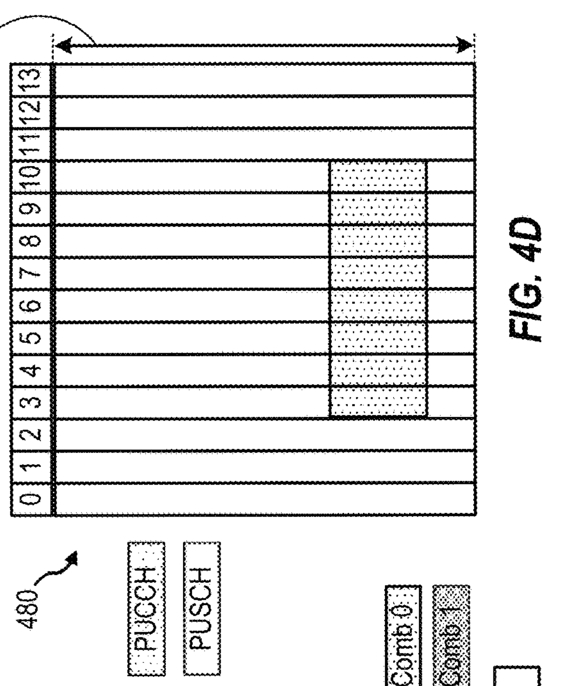
Figure 4C:
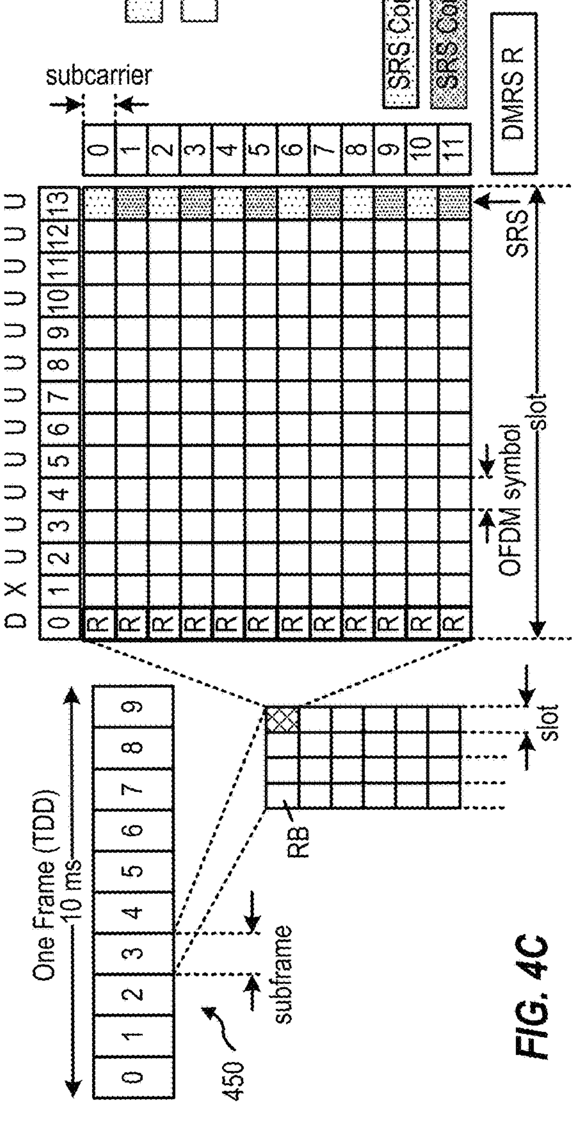

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times 15$ kHz, where μ is the numerology 0 to 6. As such, the numerology μ=0 has a subcarrier spacing of 15 kHz and the numerology μ=6 has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Full-Duplex (FD) Systems

Full-duplex (FD) allows for simultaneous transmission between nodes (e.g., a user equipment (UE) and a base station (BS)). In a half-duplex (HD) system, communication flows in one direction at a time.

There are various motivations for utilizing FD communications, for example, for simultaneous uplink (UL)/downlink (DL) transmissions in Frequency Range 2 (FR2). In some cases, FD capability may enable flexible time division duplexing (TDD) capability, and may be present at either a base station (BS) or a UE or both. For example, at the UE, UL transmissions may be sent from one antenna panel (e.g., or multiple antenna panels) and DL receptions may be performed at another antenna panel. In another example, at a gNodeB (gNB), the UL transmissions may be from one panel and the DL receptions may be performed at another panel.

The FD capability may be conditional on a beam separation (e.g., self-interference between DL and UL, clutter echo, etc.). The FD capability may mean that the UE or the gNB is able to use frequency division multiplexing (FDM) or spatial division multiplexing (SDM) on slots conventionally reserved for UL only or DL only slots (or flexible slots that may be dynamically indicated as either UL or DL).

The potential benefits of the FD communications include latency reduction (e.g., it may be possible to receive DL signals in what would be considered UL only slots, which can enable latency savings), coverage enhancement, spectrum efficiency enhancements (e.g., per cell and/or per UE), and/or overall more efficient resource utilization.

Figure 5:
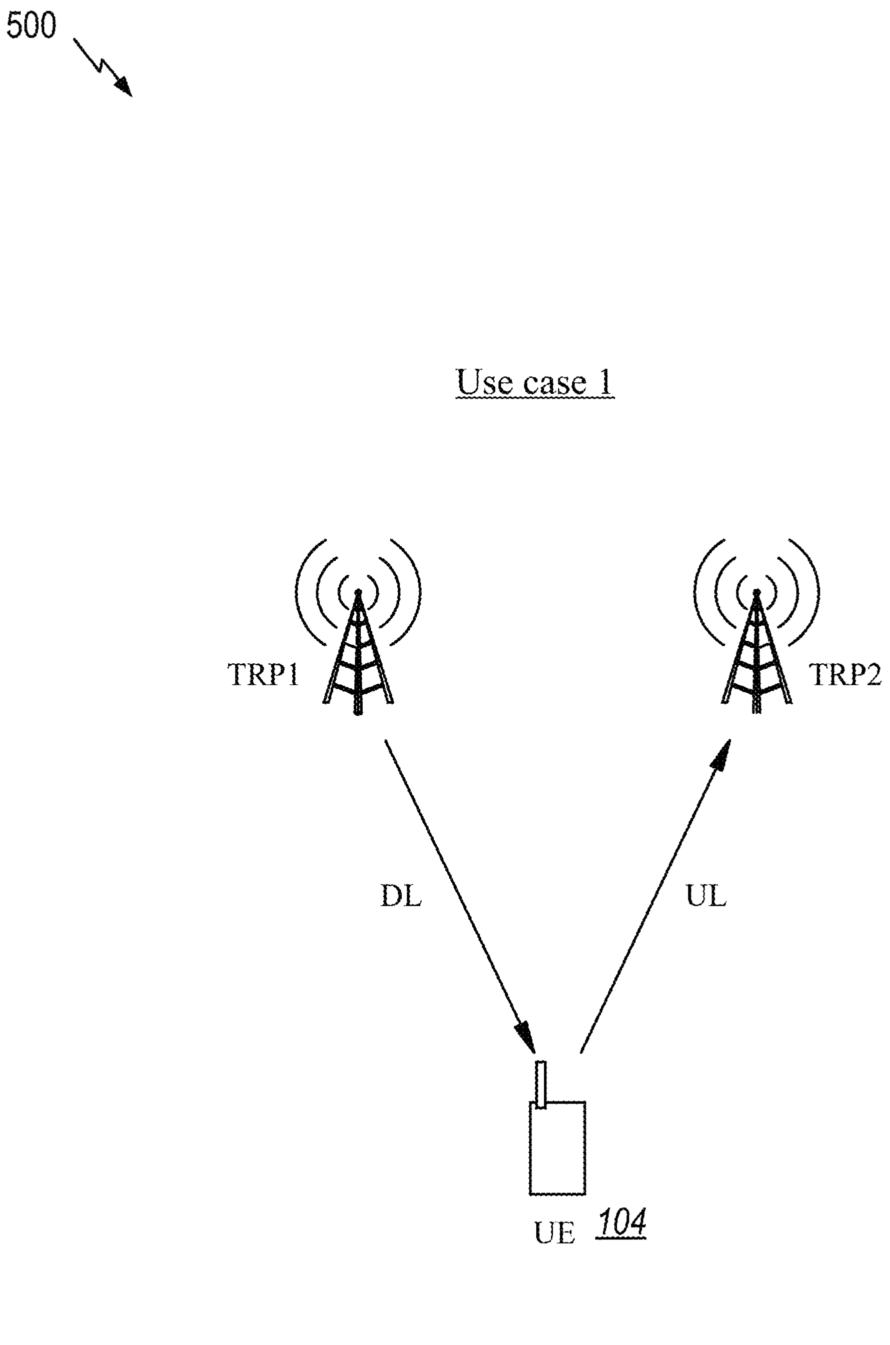
Figure 6:
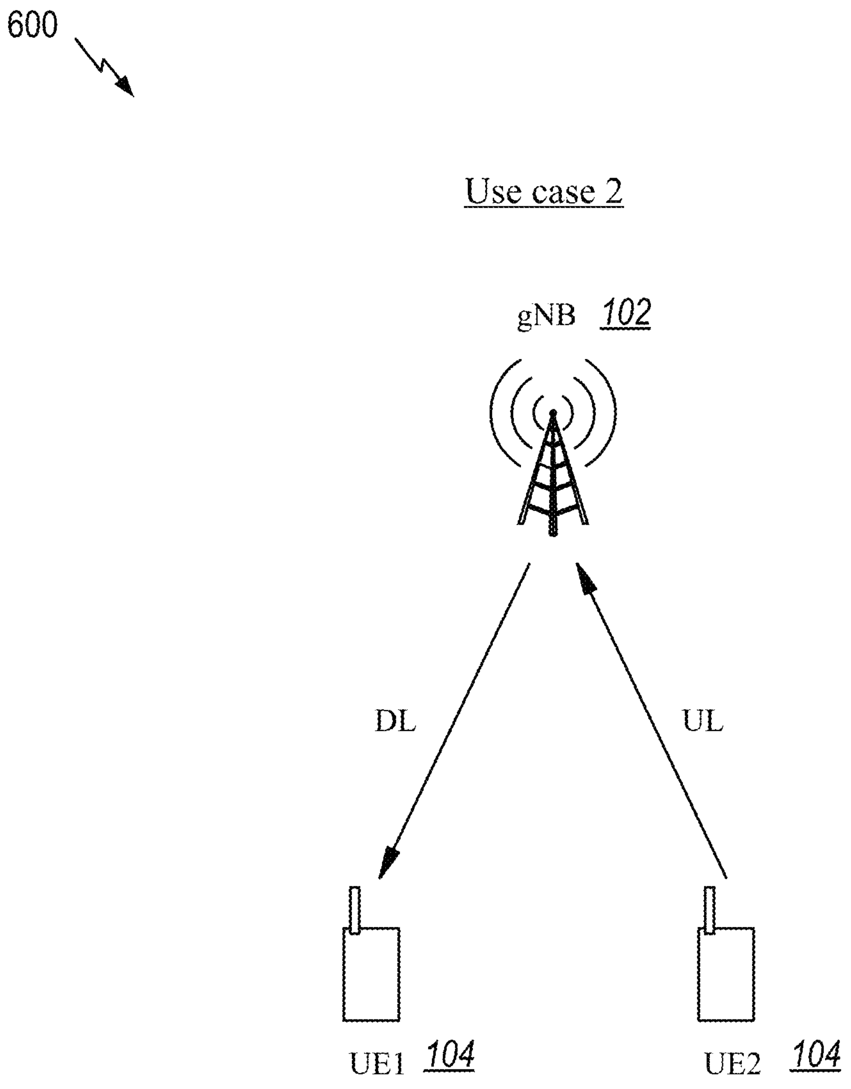
Figure 7:
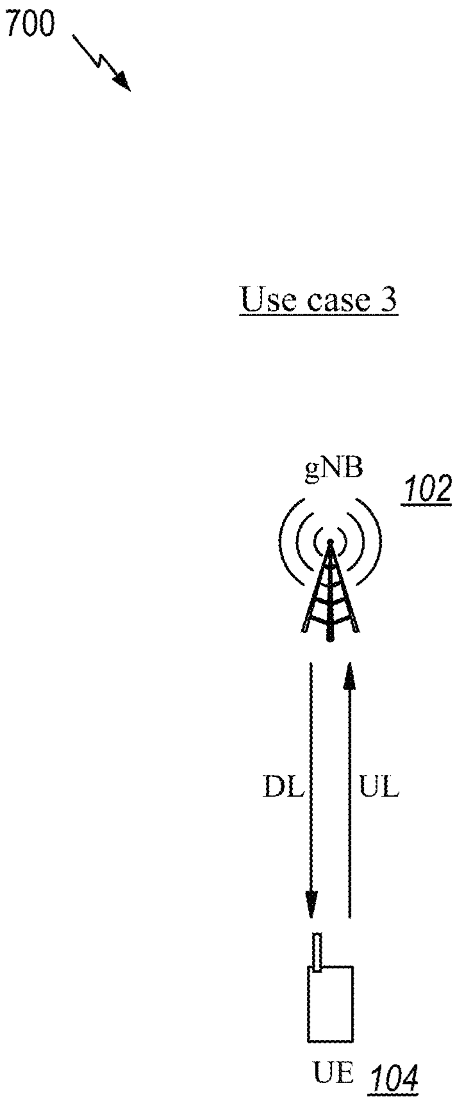

FIGS. 5-7 illustrate example use cases for FD communications.

Diagram 500 of FIG. 5 illustrates a first use case (e.g., Use Case 1) for FD communications. As illustrated, one UE 104 simultaneously communicates with a first transmitter receiver point (TRP 1) on DL, while transmitting to a second TRP on UL. For this use case, FD is disabled at a gNB (i.e., TRP 1, TRP 2) and enabled at the UE.

Diagram 600 of FIG. 6 illustrates a second use case (e.g., Use Case 2) for FD communications. As illustrated, one gNB 102 simultaneously communicates with a first UE (UE 1) on DL, while communicating with a second UE (UE 2) on UL. For this use case, FD is enabled at the gNB and disabled at the UEs. Use cases with the FD enabled at the gNB and disabled at the UEs may be suitable for integrated access and backhaul (IAB) applications as well (e.g., as illustrated in a table 800 of FIG. 8).

Diagram 700 of FIG. 7 illustrates a third use case (e.g., Use Case 3) for FD communications. As illustrated, a UE 104 simultaneously communicates with a gNB 102, transmitting on UL while receiving on DL. For this use case, FD is enabled at both the gNB and the UE.

FIG. 8 summarizes certain possible features of the use cases illustrated in FIGS. 5-7 in a table 800. As illustrated, for baseline operation, FD operation may be disabled at both the UE and gNB. For the use case (1) illustrated in FIG. 5, FD operation may be enabled at the UE and disabled at the gNB. For the use case (2) illustrated in FIG. 6, FD operation may be enabled at the gNb and disabled at the UE. For the use case (3) illustrated in FIG. 7, FD operation may be enabled at both the gNb and the UE.

Overview of Sub-Band Full Duplex (SBFD)

As compared to older communication standards, spectrum options for 5G new radio (NR) are considerably expanded. For example, a frequency range 2 (FR2) band extends from approximately 24 GHz to 60 GHz. Since the wavelength decreases as the frequency increases, the FR2 band is denoted as a millimeter wave band due to its relatively-small wavelengths. In light of this relatively short wavelength, the transmitted radio frequency (RF) signals in the FR2 band behave somewhat like visible light. Thus, just like light, millimeter-wave signals are readily shadowed by buildings and other obstacles. In addition, the received power per unit area of antenna element decreases as the frequency increases. For example, a patch antenna element is typically a fraction of the operating wavelength (e.g., one-half of the wavelength) in width and length. As the wavelength decreases (and thus the size of the antenna element decreases), it may thus be seen that the signal energy received at the corresponding antenna element decreases. Millimeter-wave cellular networks will generally require a relatively-large number of base stations (BSs) due to the issues of shadowing and decreased received signal strength. A cellular provider must typically rent the real estate for the BSs such that widespread coverage for a millimeter-wave cellular network may become very costly.

As compared to the challenges of FR2, the electromagnetic properties of radio wave propagation in the sub-6 GHz bands are more accommodating. For example, the 5G NR frequency range 1 (FR1) band extends from approximately 0.4 GHz to 7 GHz. At these lower frequencies, the transmitted RF signals tend to refract around obstacles such as buildings so that the issues of shadowing are reduced. In addition, the larger size for each antenna element means that a FR1 antenna element intercepts more signal energy as compared to an FR2 antenna element. Thus, just as was established for older networks, a 5G NR cellular network operating in the FR1 band will not require an inordinate amount of BSs. Given the favorable properties of the lower frequency bands, the sub-6 GHz bands are often denoted as "beachfront" bands due to their desirability.

One issue with operation in the sub-6 GHz bands is that there is only so much bandwidth available. For this reason, Federal Communications Commission regulates the airwaves and conducts auctions for the limited bandwidth in the FR1 band. Given this limited bandwidth, it is challenging for a cellular provider to enable the high data rates that would be more readily achieved in the FR2 band. To meet these challenges, a "sub-band full duplex" (SBFD) network architecture is implemented, which is quite advantageous as it offers users the high data rates that would otherwise require usage of the FR2 band. The SBFD network architecture described herein provides the high data rates in the FR1 band, and thus lowers costs due to the smaller number of BSs per given area of coverage that may be achieved in the FR1 band as compared to the FR2 band.

Typically, each one millisecond (ms) subframe may consist of one or multiple adjacent slots. For example, one subframe includes four slots. In a four-slot structure, first two slots may be downlink (DL) slots whereas a final one of the fours slots is an uplink (UL) slot. The third slot is a special slot in which some symbols may be used for UL transmissions and others for DL transmissions. The resulting UL and DL traffic is thus time division duplexed (TDD) as arranged by the dedicated slots and as arranged by the symbol assignment in the special slot. Since the UL has only a single dedicated slot, UL communication may suffer from excessive latency since a user equipment (UE) is restricted to transmitting in the single dedicated UL slot and in the resource allocations within the special slot. Since there is only one dedicated UL slot in the repeating four-slot structure, the resulting latency can be problematic, particularly for low-latency applications such as vehicle-to-vehicle communication. In addition, the energy for the UL communication is limited by its single dedicated slot.

To reduce uplink latency and increase the energy for the UL transmissions, SBFD mode may be implemented. The SBFD mode is a duplex mode with a TDD carrier split into sub-bands to enable simultaneous transmission and reception in same slots. For example, in the SBFD mode, some symbols may be modified as SBFD symbols to support frequency duplexing for simultaneous UL and DL transmissions. Some slots may remain as legacy TDD slots where one slot is still dedicated to DL and another slot dedicated to UL. In one example four-slot structure, in the SBFD mode, the second and third slots may be SBFD symbols modified to support frequency duplexing for simultaneous UL and DL transmissions. The first slot and the fourth slot may remain as legacy TDD slots such that the first slot is still dedicated to DL and the fourth slot dedicated to UL. In other examples, any slot may be used in the SBFD mode.

In the sub-6 GHz spectrum, the relatively-limited separation between antennas on a device will lead to substantial self-interference should the device engage in a simultaneous UL and DL transmission. In some cases, the frequency duplexing in the SBFD symbols may be practiced by a BS transceiver.

Figure 9A:
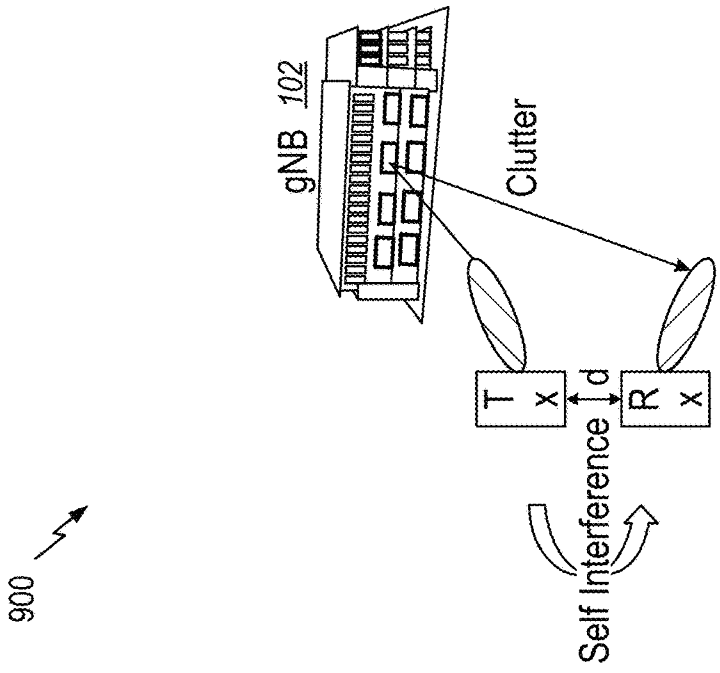
FIGS. 9A, 9B, and 9C depict examples of FD operation at a gNodeB (gNB).

For example, diagram 900 of FIG. 9A depicts full-duplex (FD) operation at a gNodeB (gNB) 102. An antenna system for the gNB is subdivided into a first antenna array that is separated from a second antenna array by an insulating distance such as, for example, 10 to 30 cm. In this case, self-interference may be caused where uplink transmissions from the UE interfere with downlink reception and may also cause clutter.

Figure 9B:
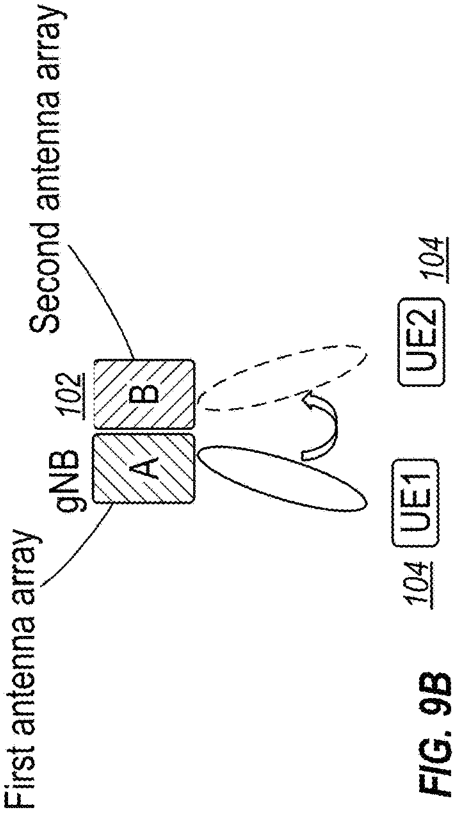

As illustrated in FIG. 9B, during the SBFD operation, one of the antenna arrays transmits (e.g., to a first UE (UE1)) while the other antenna array is receiving (e.g., from a second UE (UE2)). In this case, self-interference may be caused where downlink transmissions from one antenna array interfere with uplink reception on the other antenna array.

Figure 9C:
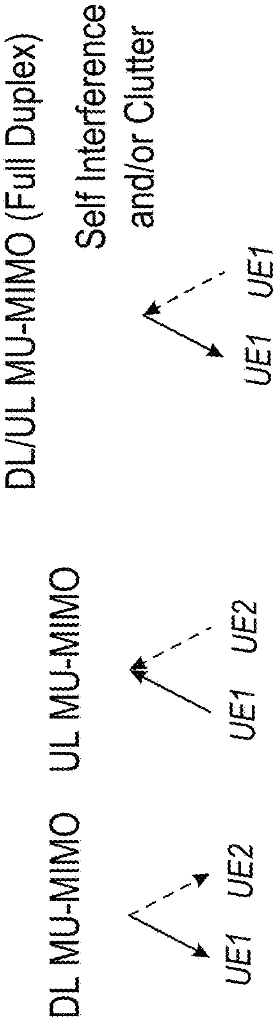

As illustrated in FIG. 9C, CLI may occur in DL MU-MIMO, where a DL transmission from UE1 potentially interferes with reception by UE2, as well as UL MU-MIMO, where an UL transmission from UE1 potentially interferes with an UL transmission from UE2. In a FD scenario, in addition to CLI, UEs may be subject to self-interference and/or clutter.

The self-interference problem is partially addressed by a physical separation between the antenna arrays of the gNB. To provide additional isolation, a conducting shield between the antenna arrays of the gNB may also be implemented. It will be appreciated, however, that frequency duplexing may also be practiced by the device (or more generally, a UE) should the device practice sufficient self-interference cancellation. In other cases, however, the UE may be limited to half-duplex (HD) transmission such that the UE's antenna array is entirely dedicated to just transmitting or to just receiving in respective slots.

Figure 10B:
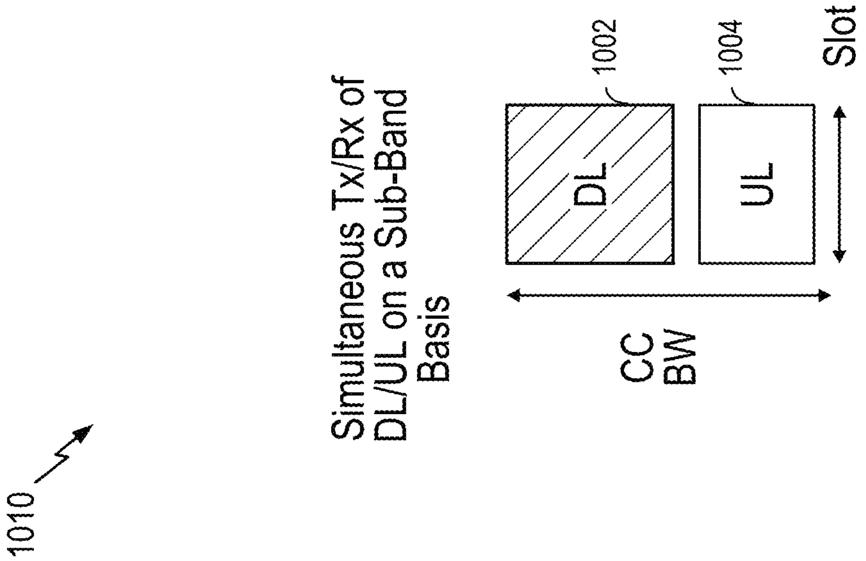
FIGS. 10A and 10B depict example sub-band full duplex (SBFD) slot configuration.
Figure 10A:
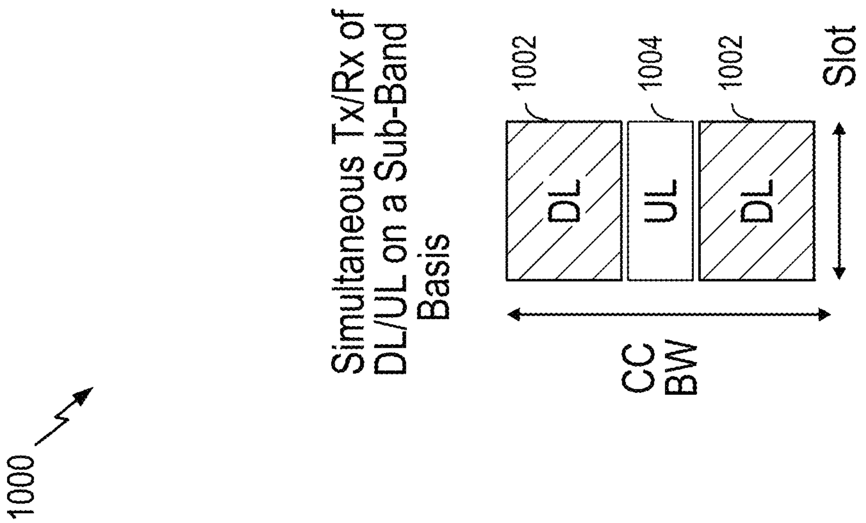

Example SBFD slots are depicted in FIG. 10A and FIG. 10B. For example, FIG. 10A depicts SBFD slot 1000 and FIG. 10B depicts SBFD slot 1010. Note that neither the UL nor the DL in the SBFD slots 1000, 1010 may occupy an entire frequency resource range (e.g., a frequency band) for these SBFD slots.

As depicted in FIG. 10A, the UL occupies a central sub-band 1004 in the frequency band for the SBFD slot 1000, while the DL occupies upper and lower sub-bands as shown at 1002. In the example of FIG. 10B, SBFD slot 1010 includes only one DL subband 1002. In some cases, the SBFD slot configuration shown in FIG. 10A may be more flexible and able to accommodate increased downlink traffic.

In some cases, the sub-bands may be separated by a guard band. The DL also occupies an upper sub-band in the frequency band and extends from a greatest frequency for the UL central sub-band to a greatest frequency for the frequency band. In one example, the UL central sub-band may be symmetric about a center frequency for the SBFD slot 1000. In such example, the bandwidth for the DL lower sub-band and the DL upper sub-band would be equal. However, in other examples, the DL lower sub-band bandwidth may be different from the bandwidth for the DL upper sub-band. In some examples, the DL upper and lower sub-bands may each have the bandwidth that may vary as 10 MHz, 20 MHz, 30 MHz or 40 MHz depending upon a DL data rate.

The use of the SBFD slot is advantageous with regard to minimizing or reducing UE-to-UE interference and transmit-to-receive self-interference at a BS. In some cases, the use of the SBFD slot may also enhance system capacity, improve resource utilization and spectrum efficiency (e.g., by enabling flexible and dynamic UL/DL resource adaption according to UL/DL traffic in a robust manner).

In some cases, SBFD operation may be enabled in symbols configured as flexible in TDD-UL-DL-ConfigCommon. For example, for SBFD operation in a symbol configured as flexible in TDD-UL-DL-ConfigCommon, various options may be considered for SBFD aware UEs.

Figure 11A:
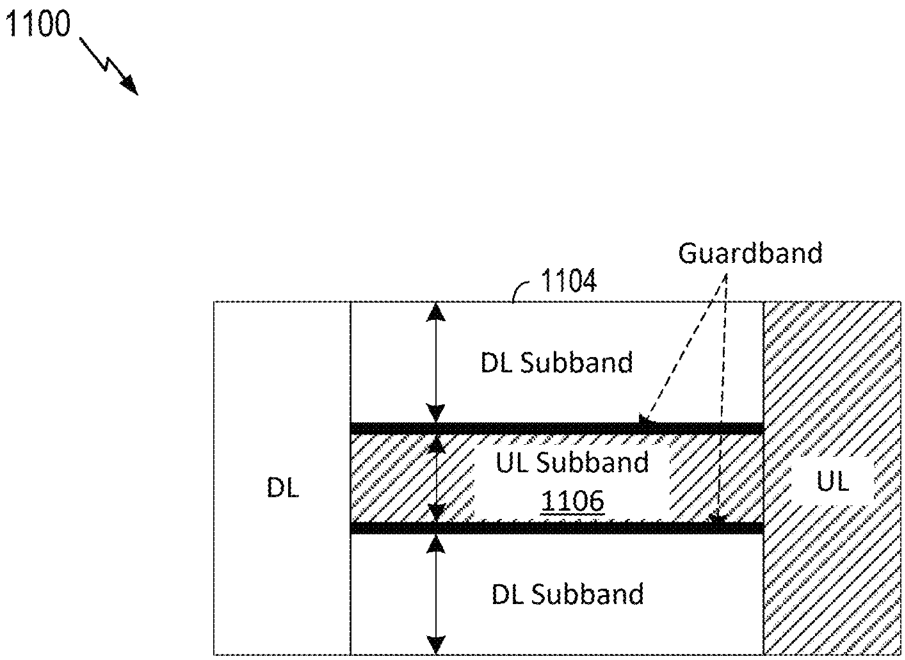
FIGS. 11A and 11B depict example SBFD configurations.

Referring to FIG. 11A, according to a first option, UL transmissions may be allowed within an UL subband 1106 in the symbol, while UL transmissions outside UL subband 1106 may not be allowed (e.g., prohibited). Frequency locations of DL subband(s) 1104 may be known to an SBFD aware UE. Therefore, DL receptions within DL subband(s) 1104 may be allowed in the symbol. Whether or not DL receptions are allowed outside DL subband(s) may also be considered.

Figure 11B:
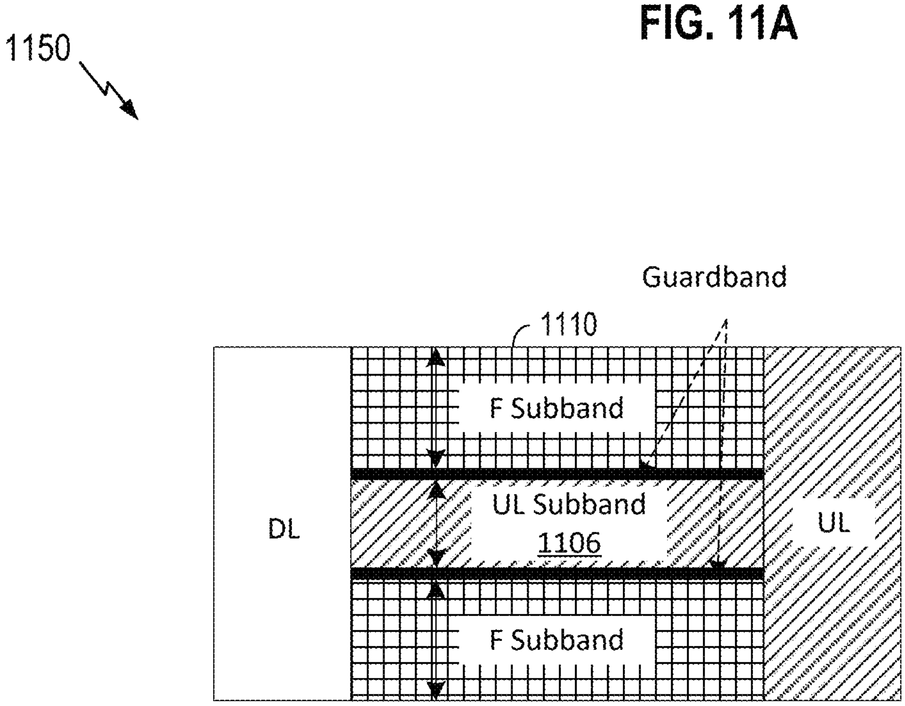

Referring to FIG. 11B, according to a second option, UL transmissions within UL subband 1106 may be allowed in the symbol. The RBs (in flexible "F" subbands 1110) outside the UL subband 1106 can be used as either as UL or DL excluding guardband(s) if used, in the symbol from gNB's perspective, and the transmission direction for all those RBs is the same. Various types of SBFD aware UE behaviours may be considered, as well as whether or not there should be signalling of guardband(s) location(s), and whether or not the symbol can be converted to a DL-only symbol. Frequency locations of DL subband(s) may be known to the SBFD aware UE, such that DL receptions within DL subband(s) may be allowed in the symbol.

UL transmissions may be within an active UL BWP and DL receptions may be within an active DL BWP in the symbol for both options described above. For all RBs outside the UL subband, UE cannot use separate RBs for DL and UL simultaneously In some cases, SBFD operation at a gNB for UEs may be implemented under various assumptions. These assumptions may include, for example, that SBFD operation is within a TDD carrier, an SBFD scheme is within a single configured DL and UL BWP pair with aligned center frequencies, and up to one UL subband may be configured for SBFD operation in an SBFD symbol within a TDD carrier. In some cases, for UEs in an RRC_CONNECTED state, both time and frequency locations of subbands for SBFD operation may be known to SBFD aware UEs.

The use of the SBFD slot is advantageous with regard to minimizing or reducing UE-to-UE interference and transmit-to-receive self-interference at a BS. In some cases, the use of the SBFD slot may also enhance system capacity, improve resource utilization and spectrum efficiency (e.g., by enabling flexible and dynamic UL/DL resource adaption according to UL/DL traffic in a robust manner).

Figure 12:
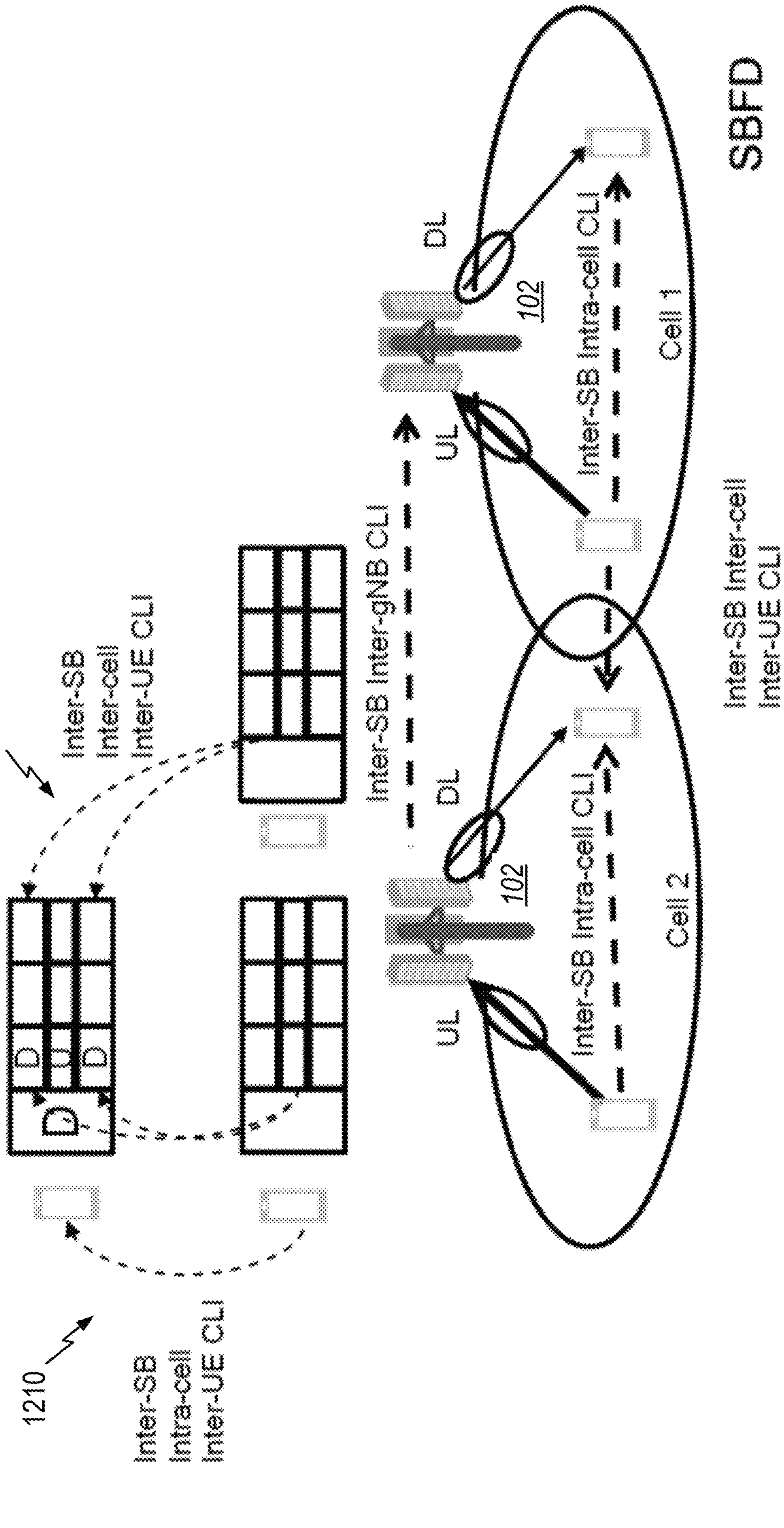
FIG. 12 and FIG. 13 depict examples of cross link interference (CLI).
Figure 13:
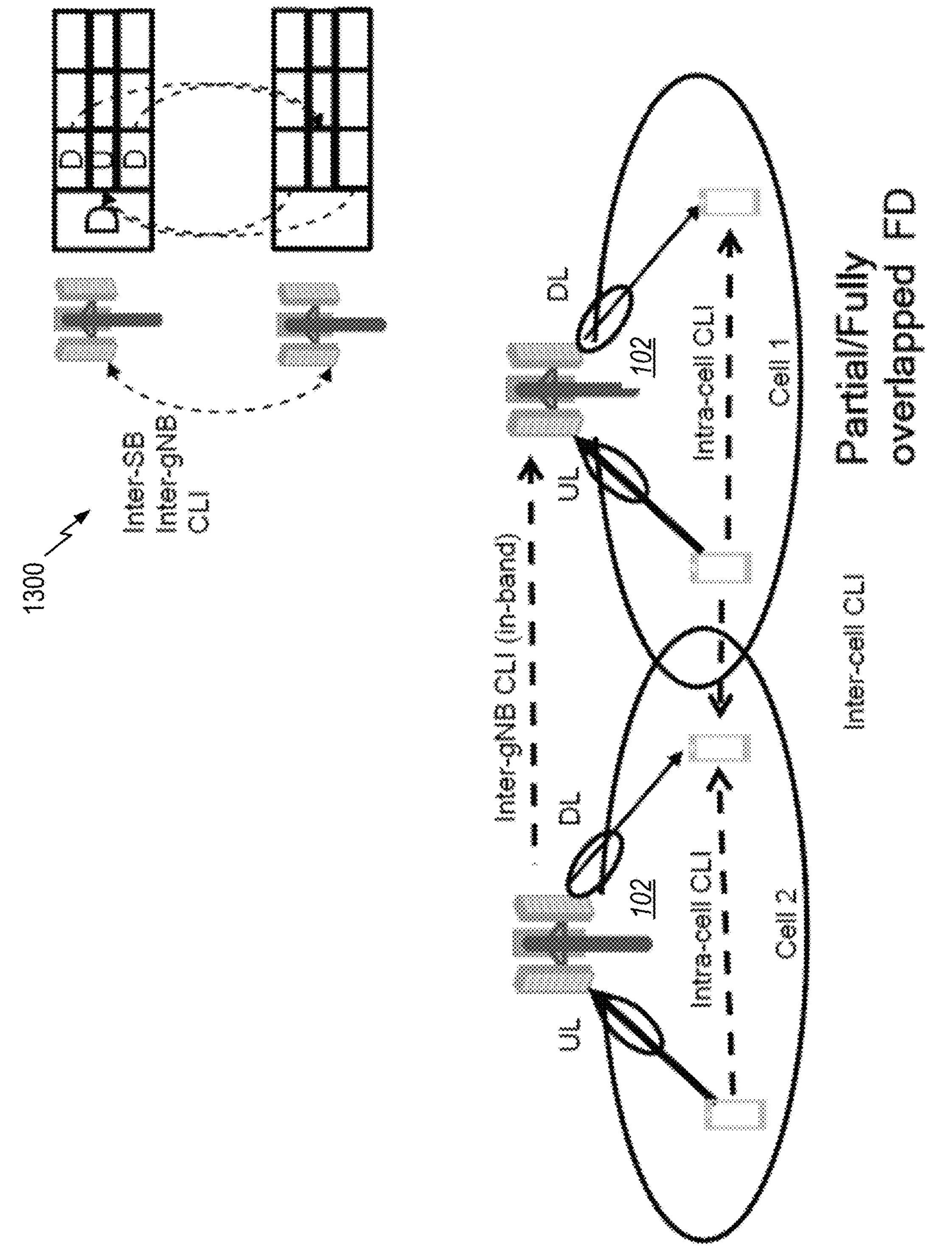

FIGS. 12 and 13 depict examples of intra-cell and inter-cell CLI in adjacent cells (Cell 1 and Cell 2) operating with SBFD.

Referring first to diagram 1200 of FIG. 12, the illustrated example assumes that a slot may be configured with both uplink (U) and downlink (D) subbands. As illustrated at 1210, this may result in (inter-SB and) intra-cell CLI in Cell 2 when a first UE transmits on the UL subband while another UE is receiving on a DL subband. Further, as illustrated at 1220, UL transmissions from a UE in Cell 1 may result in (inter-SB and) inter-cell CLI.

Referring first to diagram 1300 of FIG. 13, inter-gNB interference may also occur when a gNB in one cell transmits while the gNB in the other cell is receiving. In the illustrated example, inter-gNB CLI occurs when a transmission by the gNB in Cell 2 to a UE at a cell edge near Cell 1 interferes with uplink reception by the gNB in Cell 1 from another, nearby, UE at the cell edge.

Aspects Related to Inter-gNB CLI Inter-Subband Measurement on SBFD Symbols

As noted above, inter-gNB CLI may occur between an aggressor gNB and a victim gNB. Solutions for inter-gNB CLI mitigation may be an important focus, particularly with subband non-overlapping full duplex scenarios and partial or fully overlapping full duplex scenarios. The potential variation in SBFD subband configurations may present a challenge to CLI mitigation solutions.

Aspects of the present disclosure, however, provide subband-based CLI-RS resource configurations that may help address the challenge of inter-gNB CLI mitigation in SBFD scenarios.

The subband-based CLI-RS resource configurations proposed herein may enable co-channel CLI measurement and/or channel measurement by a victim network entity (e.g., a victim gNB) based on CLI-RS transmitted by an aggressor network entity (e.g., an aggressor gNB) on SBFD symbols. In this context, a victim gNB generally refers to a gNB that is configured to measure CLI-RS transmitted by an aggressor gNB. A victim gNB may also be referred to as a measurement gNB, while an aggressor gNB may also be referred to as a transmitting (or transmitter) gNB.

Figure 14:
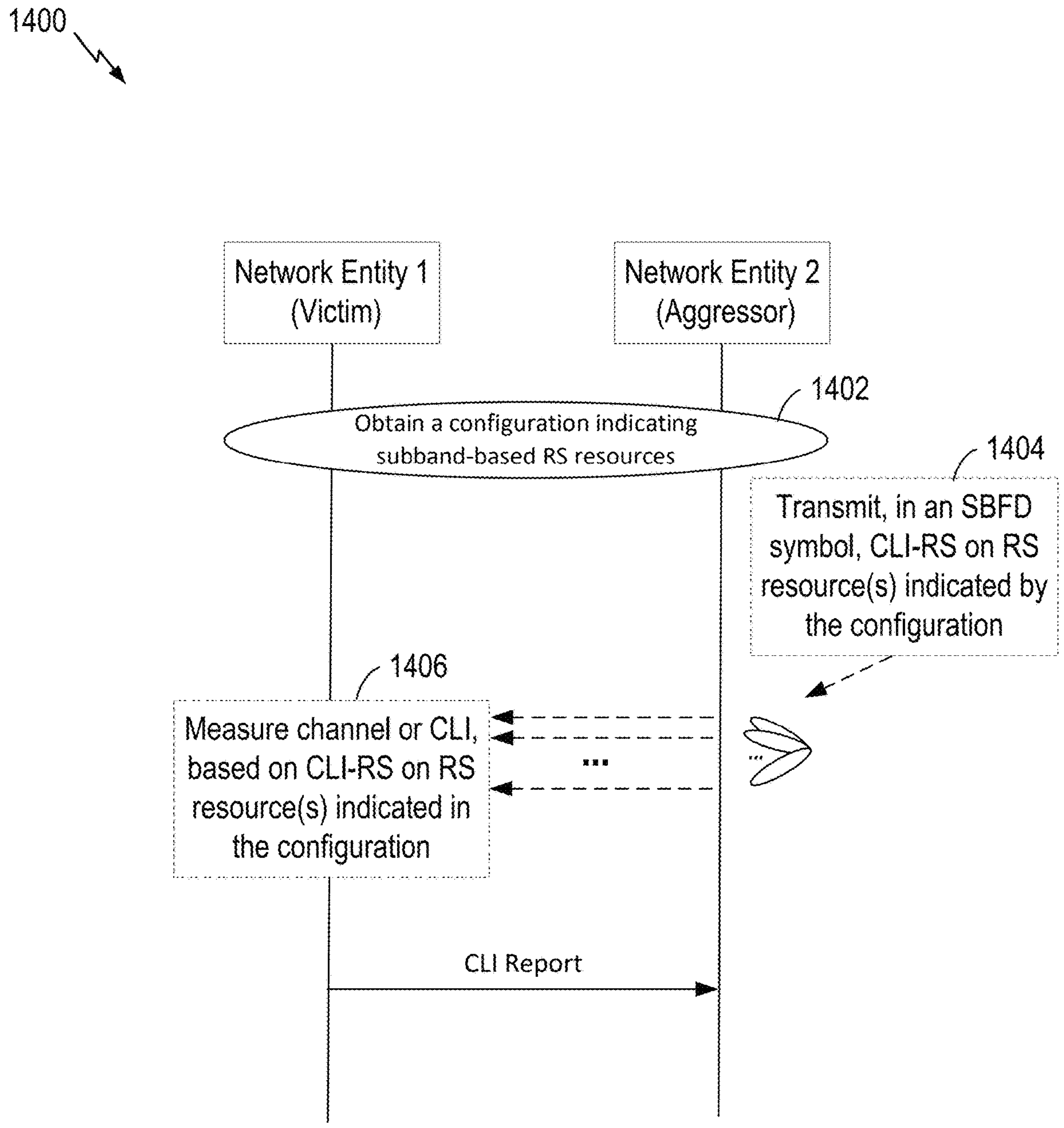
FIG. 14 depicts a call flow diagram illustrating, in accordance with certain aspects of the present disclosure.

The subband-based CLI-RS resource configuration and measurement techniques proposed herein may be understood with reference to the call flow diagram 1400 of FIG. 14. In some aspects, the network entities shown in FIG. 14 may be examples of the BS 102 (e.g., a gNB) depicted and described with respect to FIGS. 1 and 3 or a disaggregated base station depicted and described with respect to FIG. 2.

As illustrated at 1402, a first network entity (e.g., an aggressor gNB) and/or a second network entity (e.g., a victim gNB) may obtain a configuration indicating subband-based RS resources.

For example, the configuration(s) may be provided by a CU (to a DU) and/or by a DU (to an RU or another DU) and may indicate RS resources that occur in particular (e.g., uplink and/or downlink) subbands of a slot configured for SBFD operation (an SBFD slot). In some cases, the configuration may be pre-configured (e.g., defined in a standard or otherwise predefined).

In some cases, a configuration may provide partial information and a gNB may need to determine measurement resources based on the partial information. As an example of partial information, a configuration may indicate just one contiguous CSI-RS resource allocation, and a gNB may derive non-contiguous CSI-RS resources (for CLI-RS transmission/measurement) by excluding frequency resources outside DL subband(s) for in-band blocking measurement. As another example, a configuration may indicate one contiguous CSI-RS resource allocation with CSI-RS resources (for CLI-RS transmission/measurement) derived by including frequency resources in an UL subband for leakage measurement.

As indicated at 1404, the aggressor gNB may transmit, in an SBFD symbol, CLI-RS on RS resource(s) indicated by the configuration. As indicated at 1406, the victim gNB may measure a channel or CLI, based on CLI-RS on RS resource(s) indicated in the configuration.

In some cases, nulling may be used to mitigate the impact of interference. In wireless communications, a null generally refers to a direction in an antenna radiation pattern where the antenna radiates almost no radio waves, such that the far field signal strength is a local minimum. Nulls typically occur because different parts of an antenna radiate radio waves of different phase. With transmit nulling, In directions at which the antenna radiates equal amplitude radio waves of opposite phase, the radio waves essentially cancel, resulting in little or no radio power being radiated in that direction. In other directions the radio waves from different parts of the antenna are in phase and reinforce, resulting in a maximum signal strength in the radiation pattern, called a lobe. Transmit nulling can be used to intentionally prevent interfering transmissions in a certain direction. With receive nulling, a receiver's antenna can be adjusted so the direction of an interference source is located in a null of the antenna, in an effort to minimize reception of interference.

Based on the measurement, the victim gNB may perform one or more actions. For example, the victim gNB may transmit a CLI report to the aggressor gNB based on the measurement and/or perform receiver (Rx) nulling. Rx nulling may involve combiner/Rx beam determination, based on the measurement, designed to mitigate CLI (e.g., using Rx beams that are less subject to CLI than others).

Similarly, based on the CLI report, the aggressor gNB may perform one or more actions. For example, the aggressor gNB could schedule resources in a manner designed to mitigate CLI and/or perform transmit (Tx) nulling. Tx nulling may involve precoder/Tx beam determination, based on the measurement report, designed to mitigate CLI (e.g., using Tx beams that results in less CLI than others).

Figure 15:
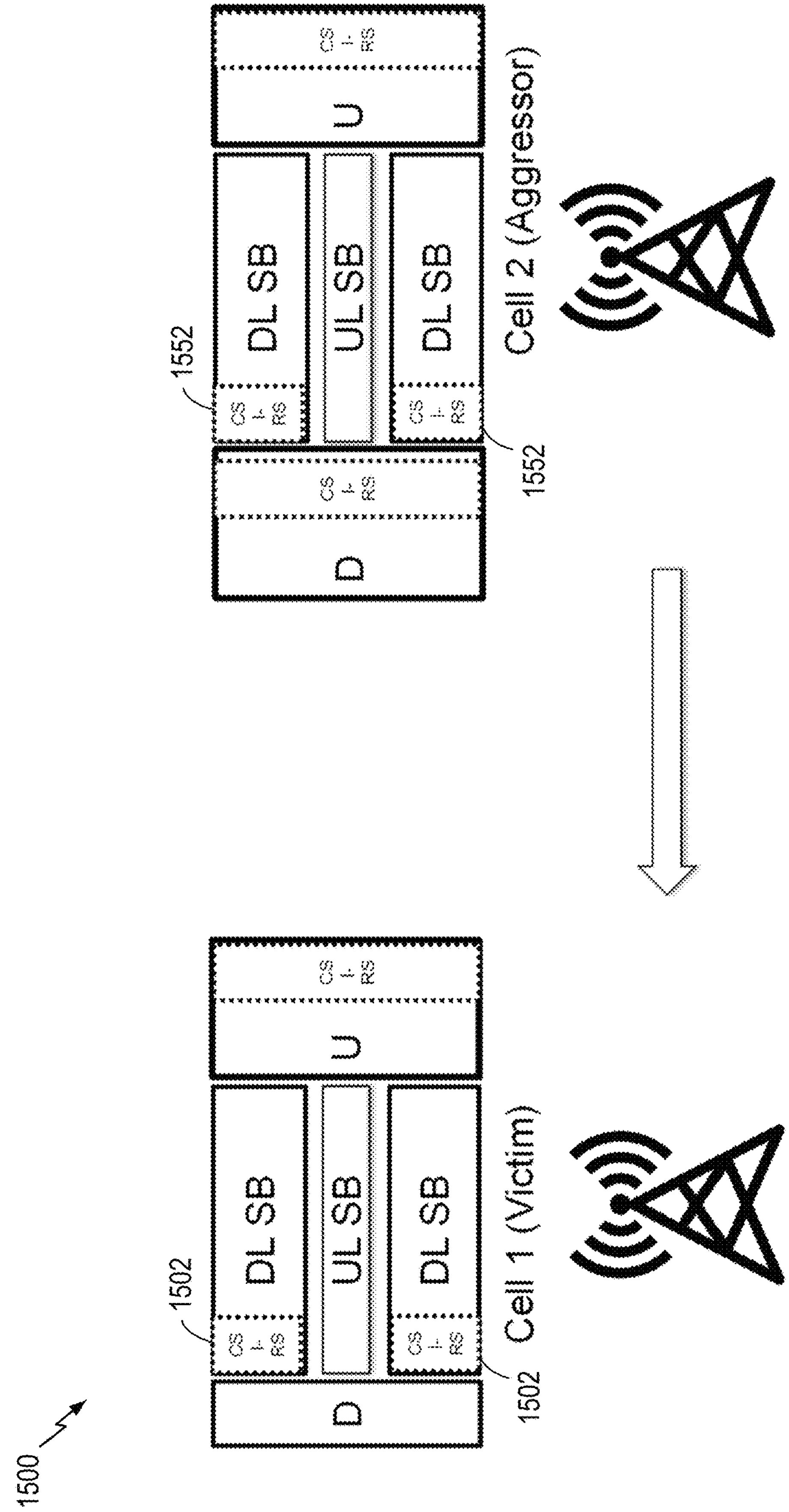
FIGS. 15-22 depict example CLI measurement scenarios for subband-based reference signal (RS) resource configurations.

As illustrated in FIG. 15, for gNB-to-gNB co-channel CLI measurement and/or channel measurement, periodic non-zero power (NZP) channel state information reference signals (CSI-RS). In some cases, synchronization signal blocks (SSBs) (e.g., cell defining/CD and/or non-cell defining/NCD) may be used as CSI-RS.

The subband-based CLI-RS resource configurations proposed herein may allow for tracking of CLI levels at the subband-level which may help a victim gNB and/or an aggressor mitigate CLI. As indicated at 1502 of diagram 1500, CSI-RS resources in downlink subbands (DL-SBs) of an SBFD slot may be measured by the victim gNB. Similarly, as indicated at 1552, the aggressor may be configured to transmit CSI-RS resources in the downlink subbands (DL-SBs) of an SBFD slot. As illustrated, the DL/UL TDD and CSI-RS configuration(s) of the victim and aggressor may or may not be the same.

In some cases, NZP CSI-RS resource configurations provided to neighbour gNBs can be used for the purpose of estimating inter-gNB CLI levels. NZP CSI-RS resource configurations provided to neighbour gNBs also may be used for the purpose of estimating (e.g., measuring) an inter-gNB channel which may help victim/aggressor (Rx/Tx) gNBs perform beamforming to reduce inter-gNB CLI.

Aspects of the present disclosure provide various proposals that enable gNB-to-gNB co-channel CLI measurement and/or channel measurement via periodic NZP CSI-RS is measured on SBFD symbols.

Figure 16:
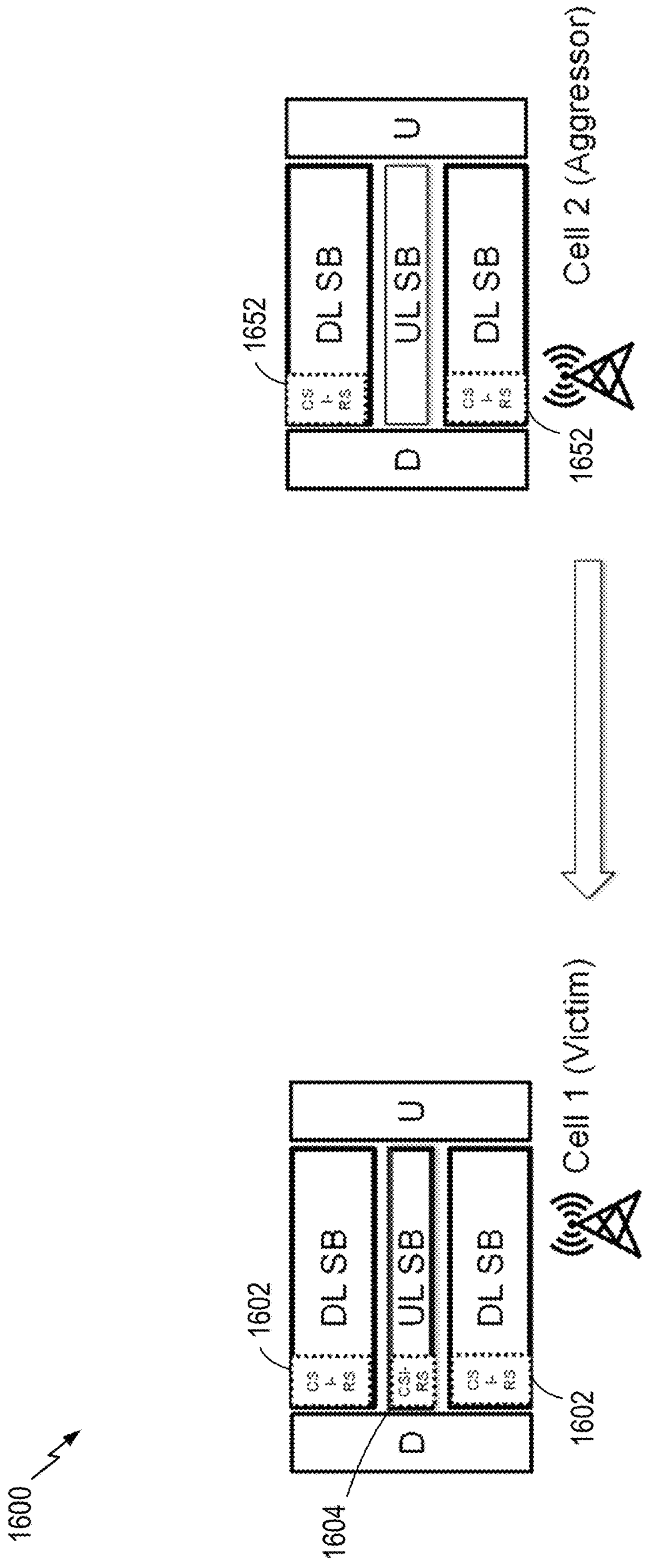

According to one proposal, as illustrated in diagram 1600 of FIG. 16, the subband-based CLI-RS resource configurations proposed herein may allow a victim gNB to measure RSSI within a UL subband (for leakage). As indicated at 1604, the victim gNB may be configured to measure CSI-RS in an UL SB of an SBFD slot, based on CSI-RS transmitted by an aggressor gNB on resources 1652 in DL SBs. In addition, or as an alternative, the victim gNB may also measure an inter-gNB channel or CLI based on CSI-RS resources 1602 in downlink subbands (DL-SBs).

Figure 17A:
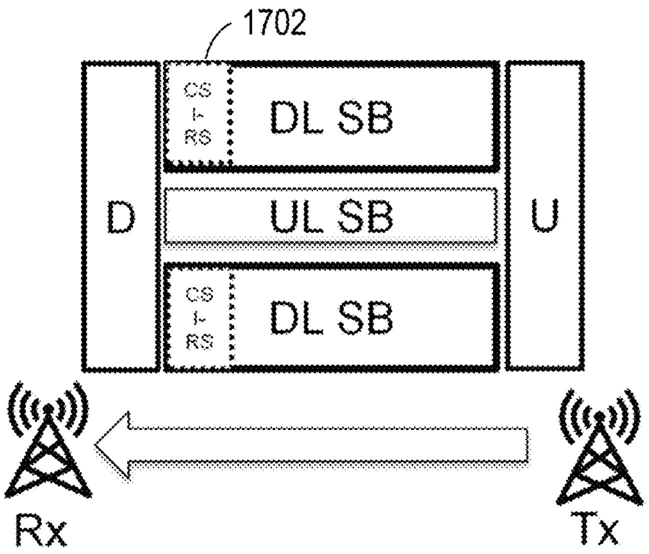

As illustrated in FIG. 17A, in some cases, a victim gNB may perform channel measurement within DL subband(s), as indicated at 1702. Because the measurement is performed for DL subband(s), this scenario may help support a use-case where the aggressor gNB makes beam/precoder determination (e.g., for Tx-Nulling) based on measurements reported by the victim gNB.

Figure 17B:
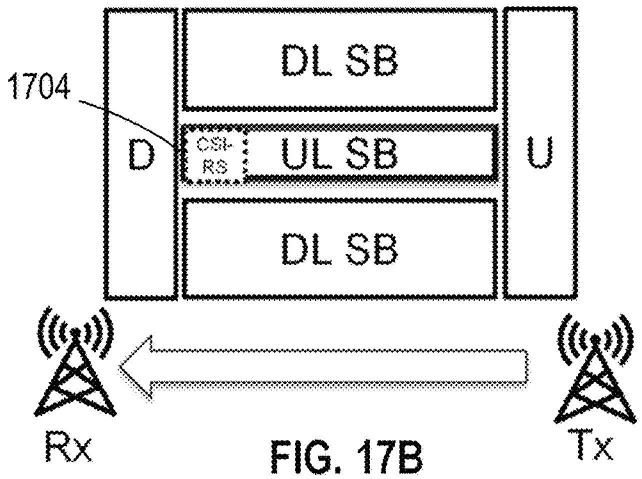

According to certain aspects, inter-gNB channel measurement may be performed according to various techniques. For example, as illustrated in FIG. 17B, a victim gNB may perform channel measurement within an UL subband, as indicated at 1704. Because the measurement is performed for the UL subband, this scenario may help support a use-case where the victim gNB performs combiner/beam determination (for Rx-nulling), based on the measurement.

Figure 17C:
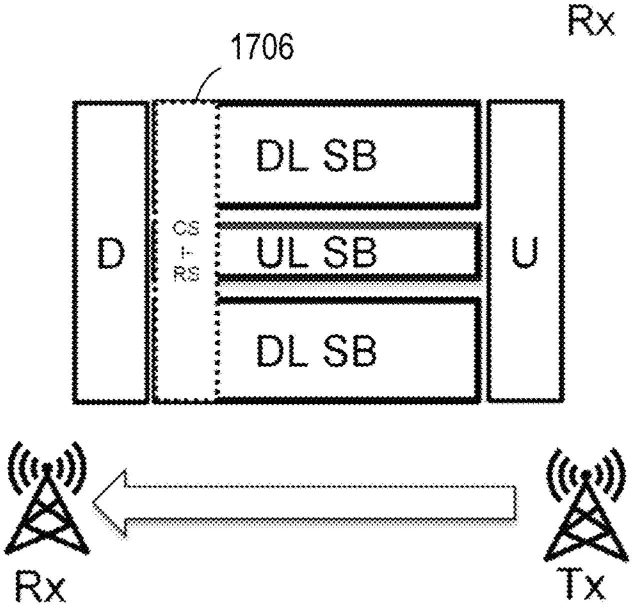

As illustrated in FIG. 17C, in some cases, a victim gNB may perform channel measurement based on contiguous CSI-RS, transmitted from the aggressor gNB, that spans DL and UL subbands, as indicated at 1706. In such cases, the victim gNB may measure across the DL and UL subbands or may exclude some subbands when measuring and/or reporting.

In some cases, configuration for subband-based CLI measurements may indicate timing information. For example, the timing information may indicate a timing offset based on a propagation delay between the victim and aggressor gNBs. In some cases, this timing information may be coordinated and/or signaled between the victim and aggressor gNBs.

Figure 18A:
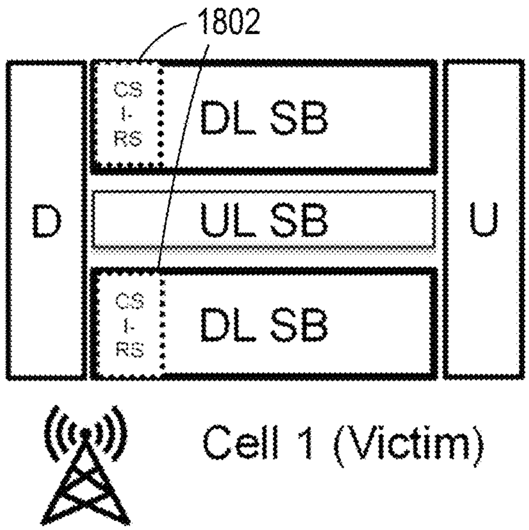
Figure 18B:
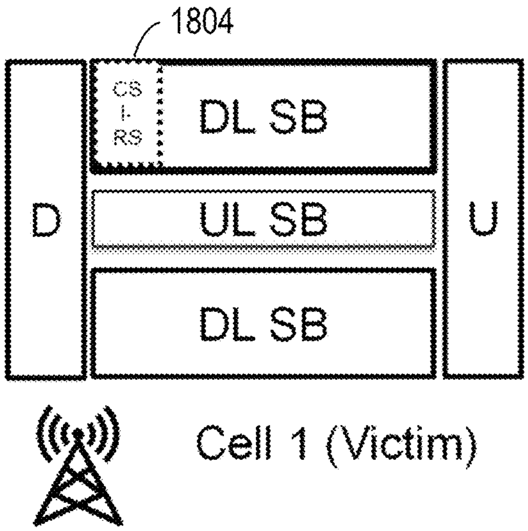

Aspects of the present disclosure provide various options for inter-gNB inter-subband CLI/channel measurement across two downlink subbands. As illustrated in FIG. 18A, according to a first option, a victim gNB may measure and/or report based on CSI-RS measurement resources in each DL subband, as indicated at 1802. As illustrated in FIG. 18B, according to a second option, the victim gNB may measure and/or report based on CSI-RS resources in one DL subband only, as indicated at 1804.

Figure 18C:
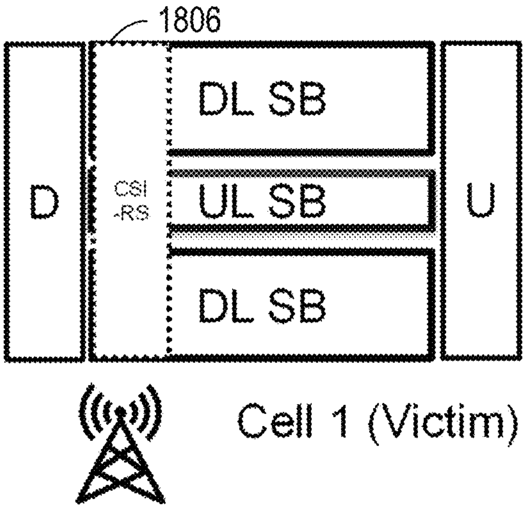

According to a third option, the victim gNB may measure and/or report based on non-contiguous CSI-RS resource across downlink subbands and a rule. For example, as illustrated in FIG. 18C, a victim gNB may be configured with CSI-RS measurement resources that span multiple DL subbands, as indicated at 1806. In general, there are various options for CSI-RS resource allocation when a victim gNB measures and/or reports based on non-contiguous CSI-RS resource across downlink subbands. According to one option, non-contiguous CSI-RS resource allocation may be indicated and non-contiguous CSI-RS resources may be derived by excluding frequency resources outside DL subbands (e.g., UL subband and guard bands).

Exactly which type of subband based inter-gNB CLI measurement method is performed may depend on various factors. In some cases, which method a victim and/or aggressor gNB are to use may be signaled by a Central Unit (CU).

According to a first option, a CU may signal and configure the measurement node (e.g., victim gNB) which method to use, including measurement metric(s) and one or more subband(s). For example, this signaling may be provided via an interface (e.g., Xn interface) signaling or over the air (OTA) signaling.

According to a second option, a gNB may coordinate with a neighbor gNB to configure the measurement node method, including measurement metric(s) and subband(s) via an interface (e.g., F1AP or Xn signaling) or OTA signaling. According to still a third option, a rule (e.g., in a standard specification) may determine the measurement node method, including measurement metric(s) and subband(s) For example, such a rule may indicate that a measurement gNB is to derive the non-contiguous CSI-RS by excluding frequency resources outside DL subband(s) on SBFD symbols.

According to certain aspects, gNB-to-gNB co-channel CLI measurement and/or channel measurement may be based on periodic NZP CSI-RS measured on both SBFD symbols and non-SBFD symbols. In such cases, there are various options for configuring the measurement in different types of symbols.

According to a first option, a CU and/or DU may coordinate to configure two separate measurement resources for SBFD and non-SBFD symbols. For example, one set of measurement resources may be configured for wideband measurement on non-SBFD symbols, while another set of measurement resources are configured for subband measurement on SBFD symbols.

According to a second option a CU and/or DU may coordinate to configure a single measurement resource for SBFD and non-SBFD symbols. For example, the single measurement resource may be a wideband measurement resource on both SBFD and non-SBFD symbols. For example, based on a rule (e.g., specified in a wireless communication standard, such as 3GPP), a measurement gNB may implicitly measure required subband(s) only. As an example, one contiguous CSI-RS resource allocation may be configured, with non-contiguous CSI-RS resource derived by excluding frequency resources outside DL subband(s) for in-band blocking measurement. As another example, one contiguous CSI-RS resource allocation may be configured with CSI-RS resources derived by including frequency resources in an UL subband for leakage measurement.

Various example scenarios of configurations for CLI (and/or channel) measurement in SBFD and non-SBFD symbols are illustrated in FIGS. 19-22.

Figure 19:
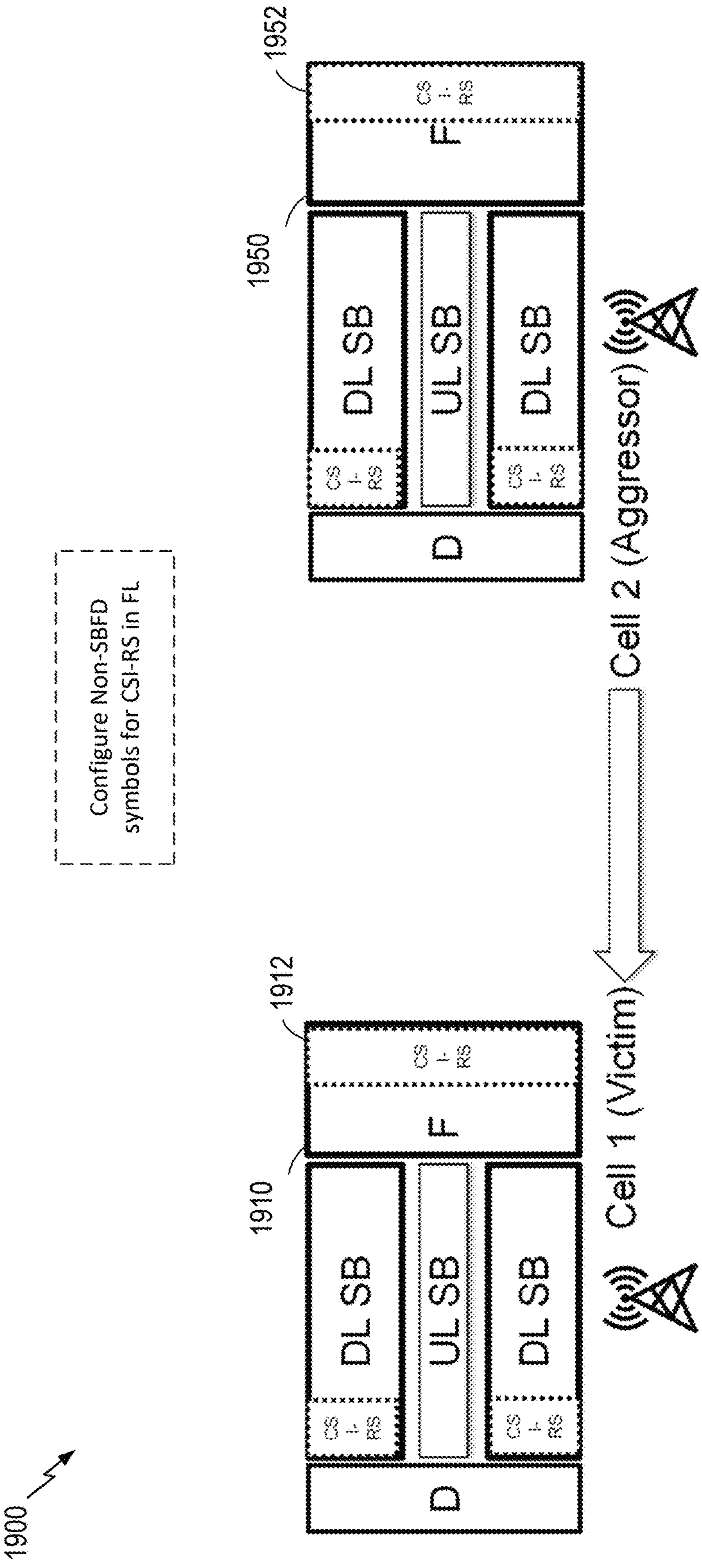

In the example scenario 1900 of FIG. 19, the victim gNB may be configured to measure CSI-RS resources 1912 in non-SBFD symbols 1910 configured as flexible (F) symbols, while the aggressor gNB may be configured to measure CSI-RS resources 1952 in non-SBFD symbols 1950 configured as flexible (F) symbols.

Figure 20:
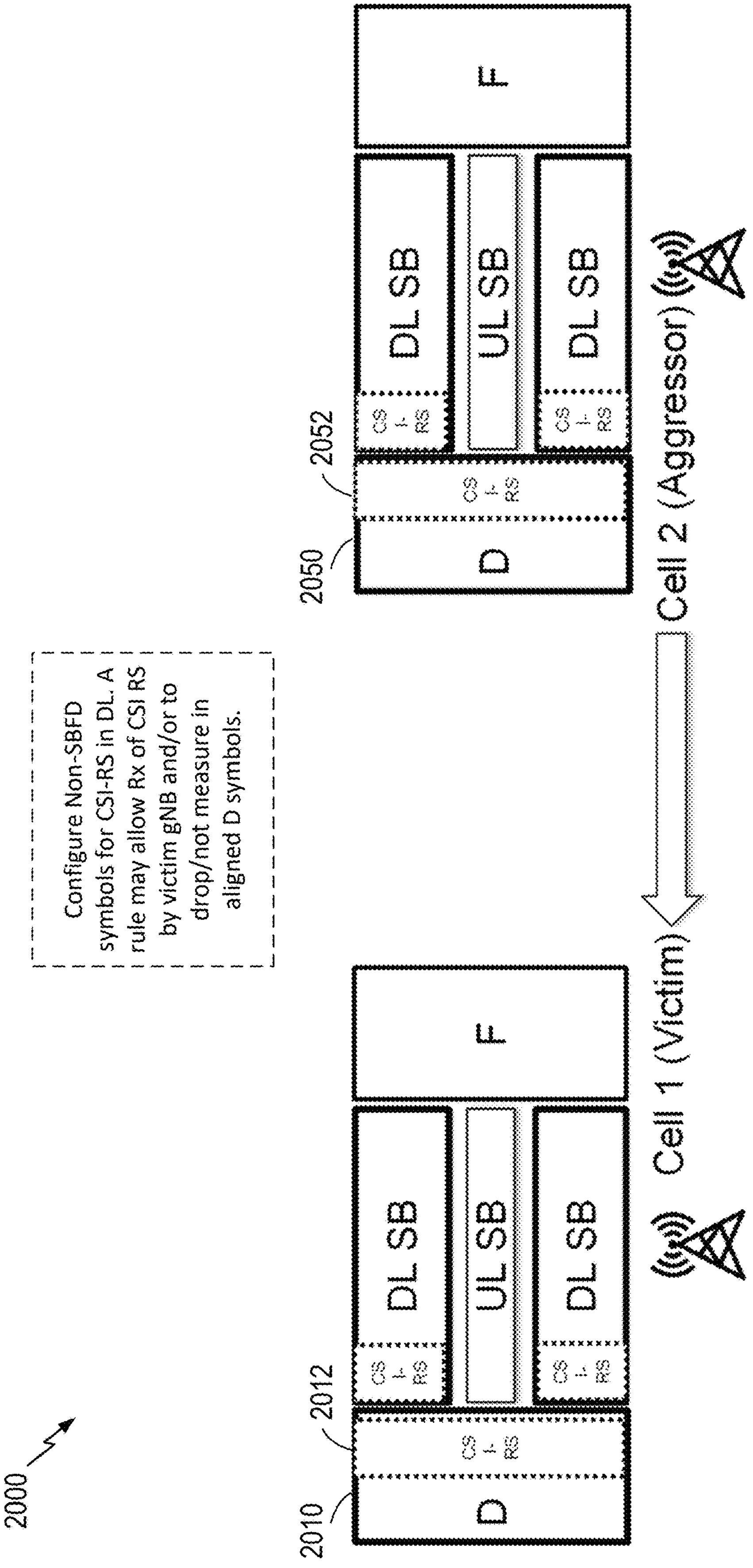

In the example scenario 2000 of FIG. 20, the victim gNB may be configured to measure CSI-RS resources 2012 in non-SBFD symbols 2010 configured as downlink (D) symbols, while the aggressor gNB may be configured to transmit CSI-RS resources 2052 in non-SBFD symbols 2050 configured as downlink (D) symbols. In such cases, a rule may be implemented to allow the victim gNB to receive CSI-RS in downlink symbols. The victim gNB may also be configured to drop or not measure (e.g., when other downlink transmissions are scheduled) in aligned D symbols.

Figure 21:
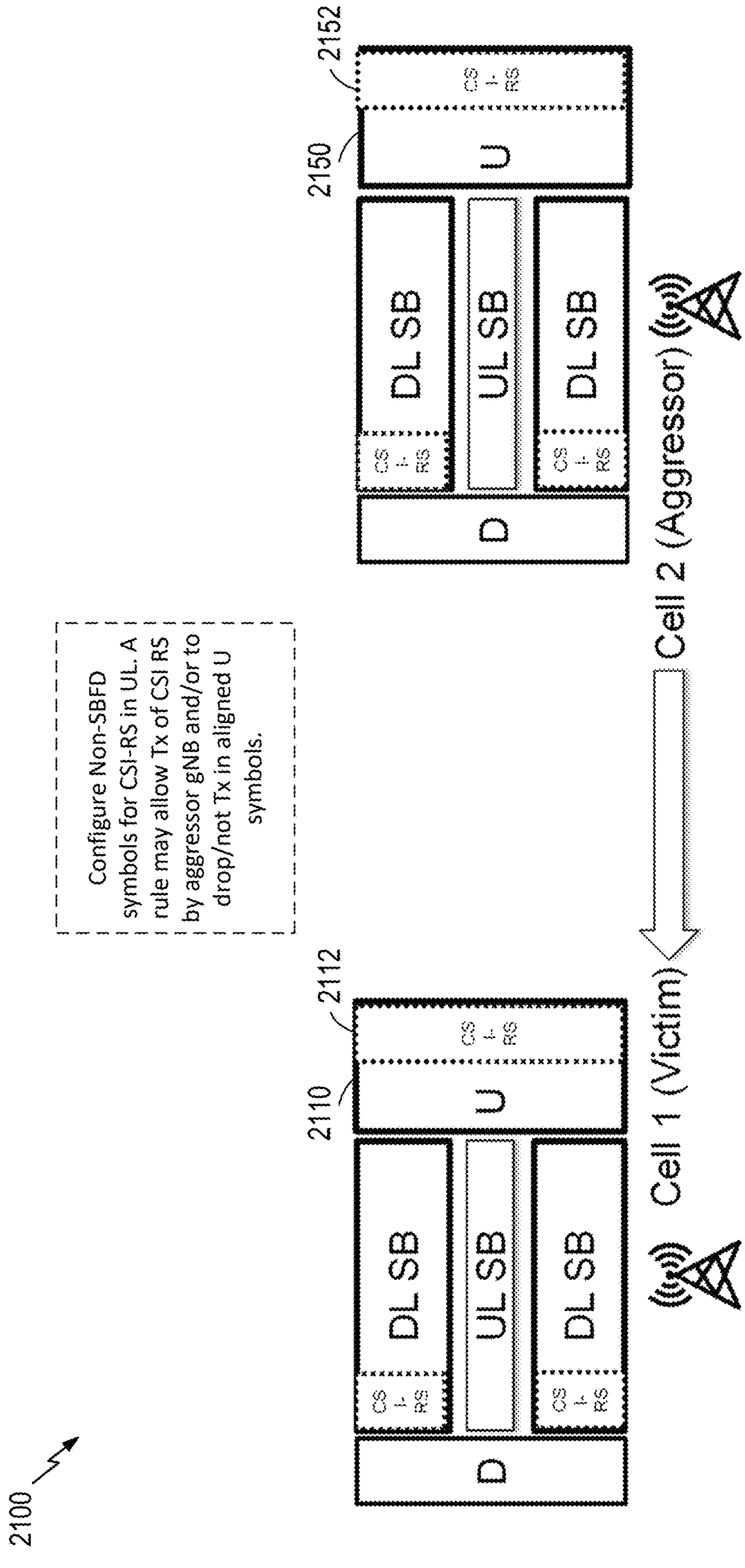

In the example scenario 2100 of FIG. 21, the victim gNB may be configured to measure CSI-RS resources 2112 in non-SBFD symbols 2110 configured as uplink (U) symbols, while the aggressor gNB may be configured to transmit CSI-RS resources 2152 in non-SBFD symbols 2150 configured as uplink (U) symbols. In such cases, a rule may be implemented to allow the aggressor gNB to transmit CSI-RS in uplink symbols. The aggressor gNB may also be configured to drop or not transmit (e.g., when other transmissions are scheduled) in aligned U symbols.

Figure 22:
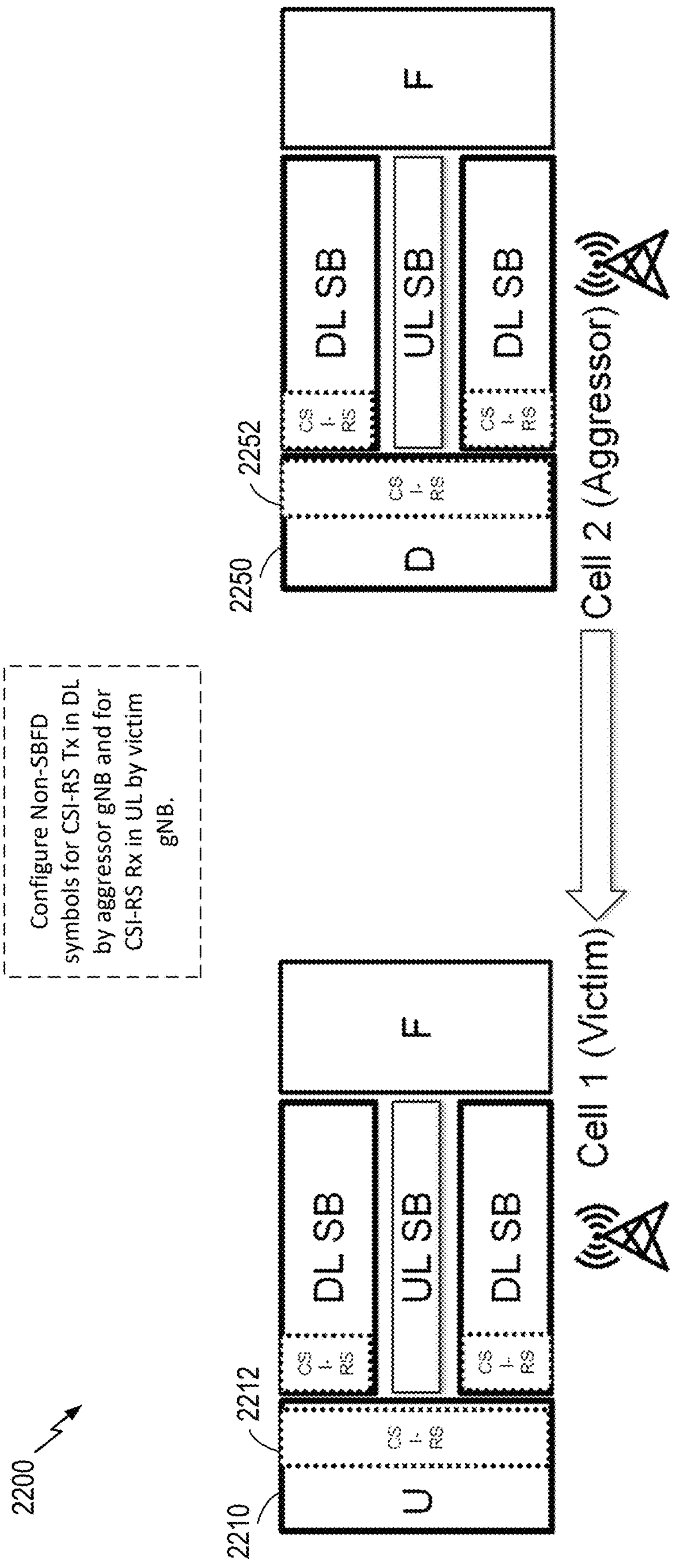

In the example scenario 2200 of FIG. 22, the victim gNB may be configured to measure CSI-RS resources 2212 in non-SBFD symbols 2210 configured as uplink (U) symbols, while the aggressor gNB may be configured to transmit CSI-RS resources 2252 in non-SBFD symbols 2250 configured as downlink (D) symbols.

Example Operations

Figure 23:
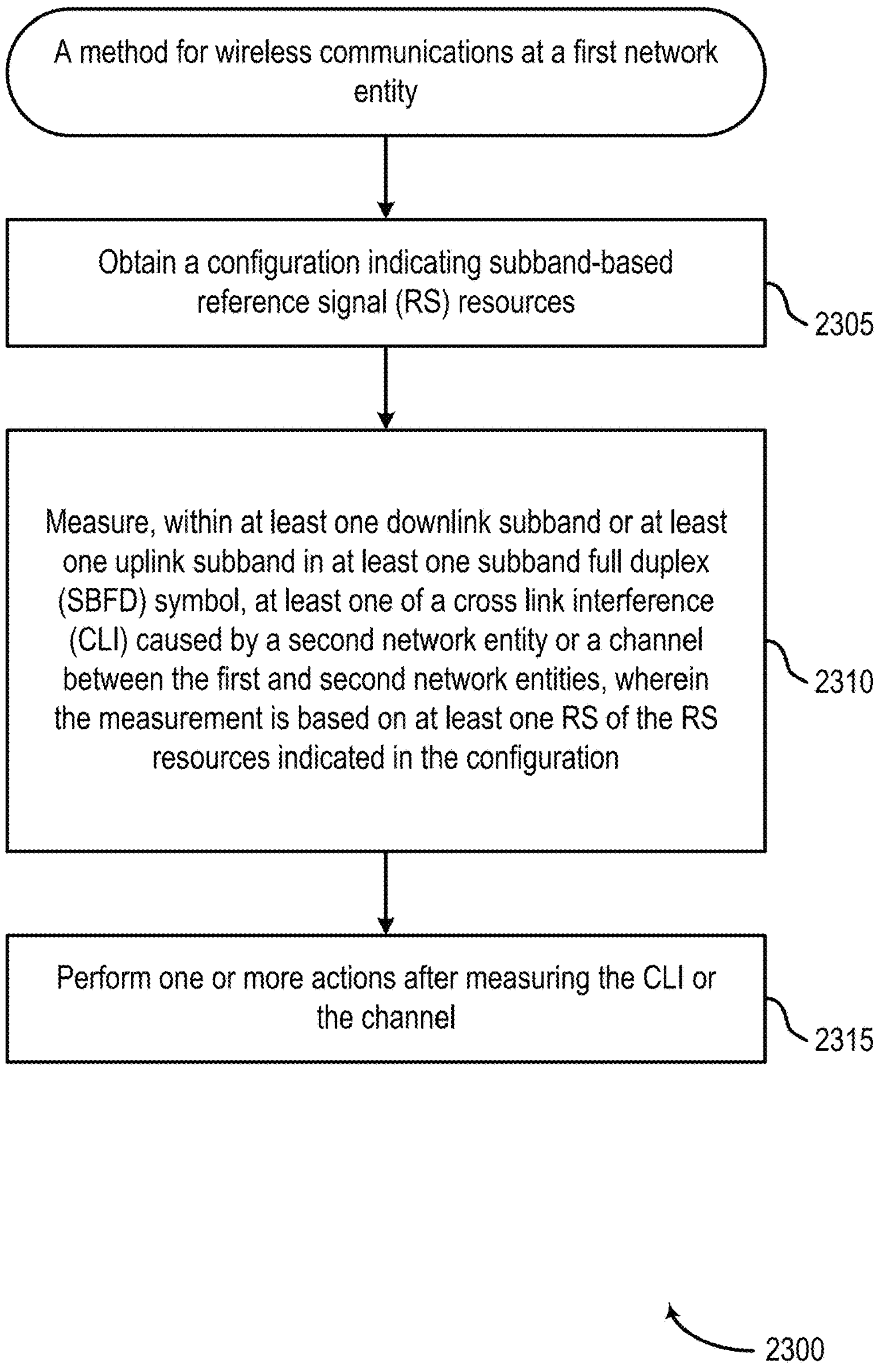
FIG. 23 depicts a method for wireless communications.

FIG. 23 shows an example of a method 2300 of wireless communications at a first network entity, such as a BS 102 of FIGS. 1 and 3, or a disaggregated base station as discussed with respect to FIG. 2.

Method 2300 begins at step 2305 with obtaining a configuration indicating subband-based reference signal (RS) resources. In some cases, the operations of this step refer to, or may be performed by, circuitry for obtaining and/or code for obtaining as described with reference to FIG. 25.

Method 2300 then proceeds to step 2310 with measuring, within at least one downlink subband or at least one uplink subband in at least one subband full duplex (SBFD) symbol, at least one of a cross link interference (CLI) caused by a second network entity or a channel between the first and second network entities, wherein the measurement is based on at least one RS of the RS resources indicated in the configuration. In some cases, the operations of this step refer to, or may be performed by, circuitry for measuring and/or code for measuring as described with reference to FIG. 25.

Method 2300 then proceeds to step 2315 with performing one or more actions after measuring the CLI or the channel. In some cases, the operations of this step refer to, or may be performed by, circuitry for performing and/or code for performing as described with reference to FIG. 25.

In some aspects, at least one of the one or more actions comprises reporting at least one metric based on the CLI or the channel measurement.

In some aspects, the measurement comprises measuring at least one CLI metric; the at least one CLI metric comprises a received signal strength indicator (RSSI) measured within the at least one uplink subband; and the measurement of the at least one CLI metric is based on a reference signal via the at least one downlink subband.

In some aspects, the measurement comprises measuring at least one CLI metric; the at least one CLI metric comprises at least one of received signal strength indicator (RSSI) measured within the at least one downlink subband or RS received power (RSRP) measured within the at least one downlink subband; and the measurement of the at least one CLI metric is based on a reference signal via the at least one downlink subband.

In some aspects, the measurement comprises measuring the channel within the at least one uplink subband, based on an RS output from the second network entity in the at least one downlink subband.

In some aspects, at least one of the one or more actions comprises receiving nulling based on the measurement of the channel within the at least one uplink subband.

In some aspects, the measurement comprises measuring the channel within the at least one downlink subband, based on: an RS output from the second network entity in the at least one downlink subband; or an RS output from the second network entity across the at least one downlink subband and the at least one uplink subband.

In some aspects, the measurement comprises measuring the channel within the at least one downlink subband, based on an RS output from the second network entity in the at least one downlink subband.

In some aspects, the configuration further indicates a timing offset, relative to a symbol boundary, to apply when measuring the at least one of the CLI or the channel.

In some aspects, the SBFD symbol is configured with at least two non-contiguous downlink subbands with at least an uplink subband and guard bands in between; and the configuration indicates separate RS resources for each of the downlink subbands, or information regarding a non-contiguous RS resource across the downlink subbands.

In some aspects, the first network entity is configured to measure RS in only one of the downlink subbands.

In some aspects, the information regarding the non-contiguous RS resource comprises an RS resource allocation that spans the downlink subbands; and the method further comprises deriving the non-contiguous RS resource by excluding frequency resources outside of the downlink subbands.

In some aspects, the first network entity comprises a distributed unit (DU) and the configuration is obtained from a central unit (CU).

In some aspects, the RS resources indicated in the configuration comprise channel state information RS (CSI-RS) measurement resources; and the method further comprises measuring at least one of CLI or a channel based on the CSI-RS measurement resources.

In some aspects, the configuration indicates separate CSI-RS resources for SBFD symbols and non-SBFD symbols.

In some aspects, the configuration indicates a common CSI-RS resource for both SBFD symbols and non-SBFD symbols; and the method further comprises deriving, from the common CSI-RS resource, one or more CSI-RS resources for at least one of CLI or channel measurement for SBFD symbols.

In some aspects, the common CSI-RS resources comprises a contiguous CSI-RS resource; and the one or more CSI-RS resources, derived from the contiguous CSI-RS resource, comprise non-contiguous CSI-RS resources.

In some aspects, the non-contiguous CSI-RS resources are derived by at least one of: excluding, from the contiguous CSI-RS resource, frequency resources outside of the at least one downlink subband; or including frequency resources within the at least one uplink subband.

In some aspects, measuring at least one of CLI or a channel in at least one non-SBFD symbol based on the CSI-RS measurement resources comprises at least one of: measuring at least one of CLI or a channel in at least one non-SBFD symbol configured as a flexible symbol; measuring at least one of CLI or a channel in at least one non-SBFD symbol configured as a downlink symbol; or measuring at least one of CLI or a channel in at least one non-SBFD symbol configured as an uplink symbol.

In some aspects, measuring at least one of CLI or a channel in flexible symbols is based on a CSI-RS measurement resource that spans the at least one uplink subband and the at least one downlink subband.

In some aspects, measuring at least one of CLI or a channel in flexible symbols is based on a CSI-RS measurement resource that spans the at least one uplink subband and the at least one downlink subband and a rule that allows reception of CSI-RS in a downlink symbol.

In some aspects, measuring at least one of CLI or a channel in flexible symbols is based on a CSI-RS measurement resource that spans the at least one uplink subband and the at least one downlink subband.

Figure 25:
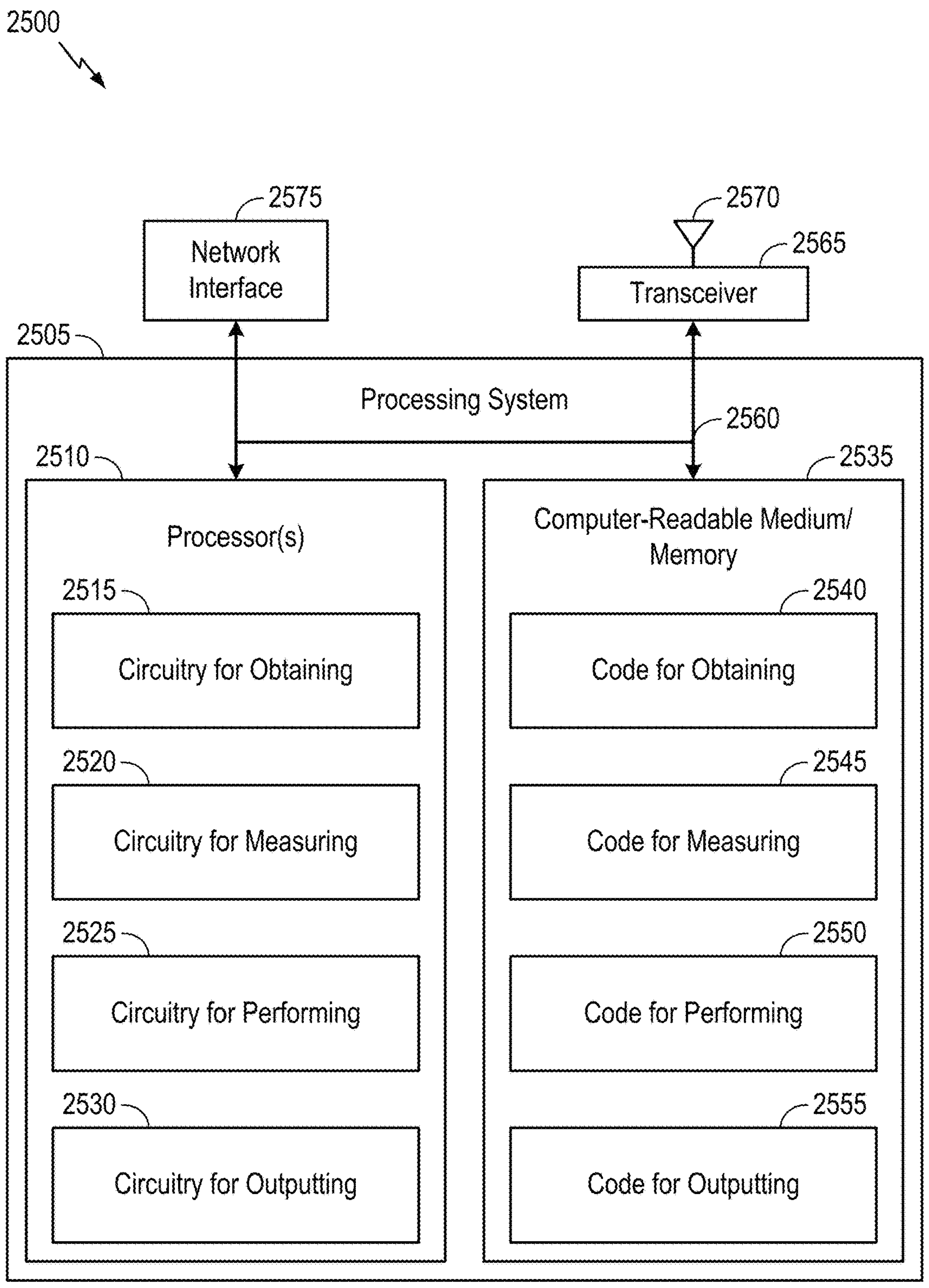
FIG. 25 depicts aspects of an example communications device.

In one aspect, method 2300, or any aspect related to it, may be performed by an apparatus, such as communications device 2500 of FIG. 25, which includes various components operable, configured, or adapted to perform the method 2300. Communications device 2500 is described below in further detail.

Note that FIG. 23 is just one example of a method, and other methods including fewer, additional, or alternative steps are possible consistent with this disclosure.

Figure 24:
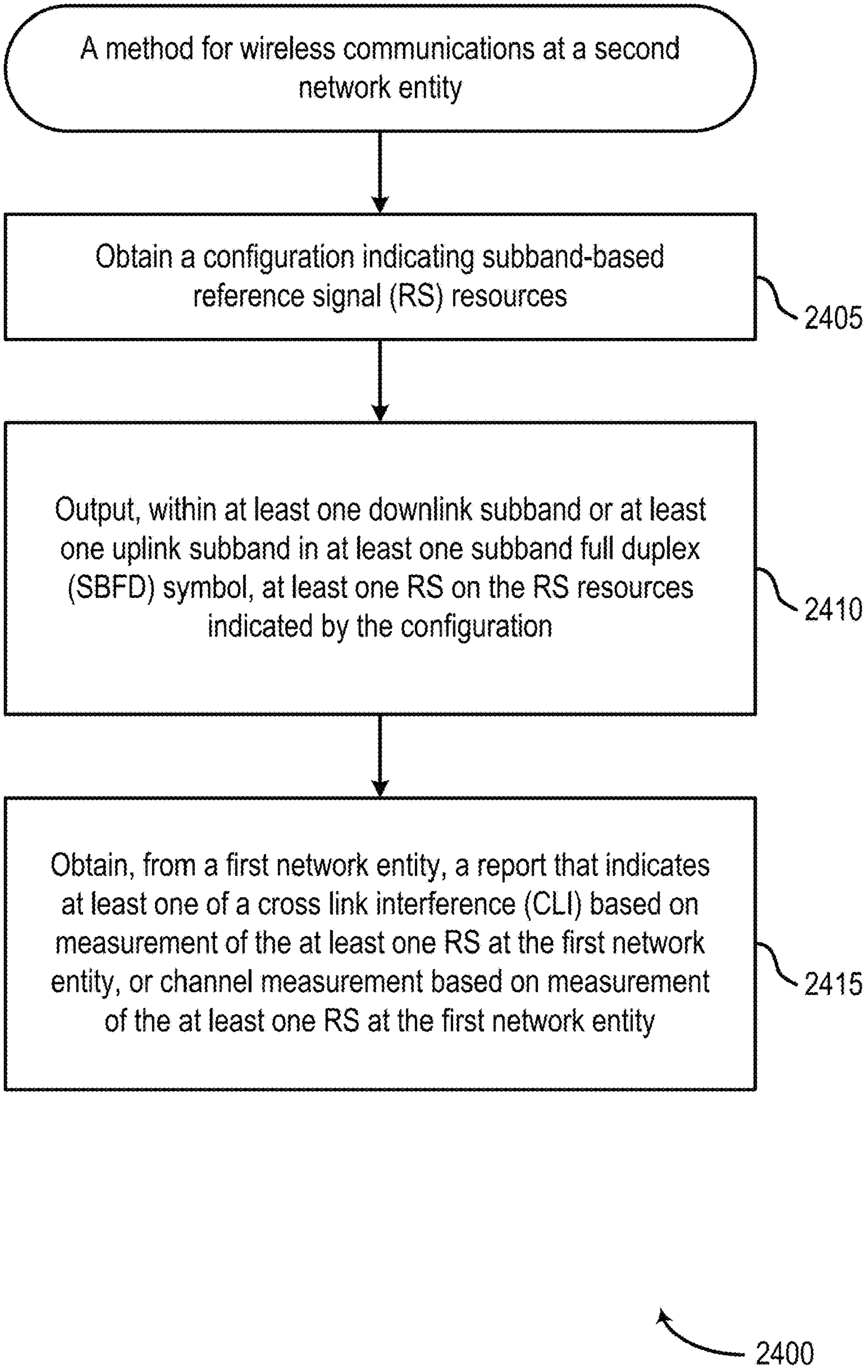
FIG. 24 depicts a method for wireless communications.

FIG. 24 shows an example of a method 2400 of wireless communications at a second network entity, such as a BS 102 of FIGS. 1 and 3, or a disaggregated base station as discussed with respect to FIG. 2.

Method 2400 begins at step 2405 with obtaining a configuration indicating subband-based reference signal (RS) resources. In some cases, the operations of this step refer to, or may be performed by, circuitry for obtaining and/or code for obtaining as described with reference to FIG. 25.

Method 2400 then proceeds to step 2410 with outputting, within at least one downlink subband or at least one uplink subband in at least one subband full duplex (SBFD) symbol, at least one RS on the RS resources indicated by the configuration. In some cases, the operations of this step refer to, or may be performed by, circuitry for outputting and/or code for outputting as described with reference to FIG. 25.

Method 2400 then proceeds to step 2415 with obtaining, from a first network entity, a report that indicates at least one of a cross link interference (CLI) based on measurement of the at least one RS at the first network entity, or channel measurement based on measurement of the at least one RS at the first network entity. In some cases, the operations of this step refer to, or may be performed by, circuitry for obtaining and/or code for obtaining as described with reference to FIG. 25.

In some aspects, the RS is output via the at least one downlink subband; and the report indicates a received signal strength indicator (RSSI) measured within the at least one uplink subband.

In some aspects, the RS is output via the at least one downlink subband; and the report indicates at least one of received signal strength indicator (RSSI) measured within the at least one downlink subband or RS received power (RSRP) measured within the at least one downlink subband.

In some aspects, the report indicates channel measurement; and the method further comprises performing transmit nulling based on the channel measurement.

In some aspects, the report indicates channel measurement within the at least one downlink subband, based on: the RS output from the second network entity in the at least one downlink subband; or the RS output from the second network entity across the at least one downlink subband and the at least one uplink subband.

In some aspects, the SBFD symbol is configured with at least two non-contiguous downlink subbands with at least an uplink subband and guard bands in between; and the configuration indicates separate RS resources for each of the downlink subbands, or information regarding a non-contiguous RS resource across the downlink subbands.

In some aspects, the second network entity is configured to output RS in only one of the downlink subbands.

In some aspects, the information regarding the non-contiguous RS resource comprises an RS resource allocation that spans the downlink subbands; and the method further comprises deriving the non-contiguous RS resource by excluding frequency resources outside of the downlink subbands.

In some aspects, the first network entity comprises a distributed unit (DU) and the configuration is obtained from a central unit (CU).

In some aspects, the RS resources indicated in the configuration comprise channel state information RS (CSI-RS) measurement resources.

In some aspects, the configuration indicates separate CSI-RS resources for SBFD symbols and non-SBFD symbols.

In some aspects, the configuration indicates a common CSI-RS resource for both SBFD symbols and non-SBFD symbols; and the method further comprises deriving, from the common CSI-RS resource, one or more CSI-RS resources for at least one of CLI or channel measurement for SBFD symbols.

In some aspects, the common CSI-RS resources comprises a contiguous CSI-RS resource; and the one or more CSI-RS resources, derived from the contiguous CSI-RS resource, comprise non-contiguous CSI-RS resources.

In some aspects, the non-contiguous CSI-RS resources are derived by at least one of: excluding, from the contiguous CSI-RS resource, frequency resources outside of the at least one downlink subband; or including frequency resources within the at least one uplink subband.

In some aspects, outputting at least one RS on the RS resources indicated by the configuration comprises at least one of: outputting the at least one RS in at least one non-SBFD symbol configured as a flexible symbol; outputting the at least one RS in at least one non-SBFD symbol configured as a downlink symbol; or outputting the at least one RS in at least one non-SBFD symbol configured as an uplink symbol.

In some aspects, outputting the at least one RS comprises outputting CSI-RS on a CSI-RS measurement resource that spans the at least one uplink subband and the at least one downlink subband.

In some aspects, outputting the at least one RS comprises outputting CSI-RS on a CSI-RS measurement resource that spans the at least one uplink subband and the at least one downlink subband.

In some aspects, outputting the at least one RS comprises outputting CSI-RS on a CSI-RS measurement resource that spans the at least one uplink subband and the at least one downlink subband, based on a rule that allows outputting of CSI-RS in an uplink symbol.

In one aspect, method 2400, or any aspect related to it, may be performed by an apparatus, such as communications device 2500 of FIG. 25, which includes various components operable, configured, or adapted to perform the method 2400. Communications device 2500 is described below in further detail.

Note that FIG. 24 is just one example of a method, and other methods including fewer, additional, or alternative steps are possible consistent with this disclosure.

Example Communications Device(s)

FIG. 25 depicts aspects of an example communications device 2500. In some aspects, communications device 2500 is a network entity, such as BS 102 of FIGS. 1 and 3, or a disaggregated base station as discussed with respect to FIG. 2.

The communications device 2500 includes a processing system 2505 coupled to the transceiver 2565 (e.g., a transmitter and/or a receiver) and/or a network interface 2575. The transceiver 2565 is configured to transmit and receive signals for the communications device 2500 via the antenna 2570, such as the various signals as described herein. The network interface 2575 is configured to obtain and send signals for the communications device 2500 via communication link(s), such as a backhaul link, midhaul link, and/or fronthaul link as described herein, such as with respect to FIG. 2. The processing system 2505 may be configured to perform processing functions for the communications device 2500, including processing signals received and/or to be transmitted by the communications device 2500.

The processing system 2505 includes one or more processors 2510. In various aspects, one or more processors 2510 may be representative of one or more of receive processor 338, transmit processor 320, TX MIMO processor 330, and/or controller/processor 340, as described with respect to FIG. 3. The one or more processors 2510 are coupled to a computer-readable medium/memory 2535 via a bus 2560. In certain aspects, the computer-readable medium/memory 2535 is configured to store instructions (e.g., computer-executable code) that when executed by the one or more processors 2510, cause the one or more processors 2510 to perform the method 2300 described with respect to FIG. 23, or any aspect related to it; and the method 2400 described with respect to FIG. 24, or any aspect related to it. Note that reference to a processor of communications device 2500 performing a function may include one or more processors 2510 of communications device 2500 performing that function.

In the depicted example, the computer-readable medium/memory 2535 stores code (e.g., executable instructions), such as code for obtaining 2540, code for measuring 2545, code for performing 2550, and code for outputting 2555. Processing of the code for obtaining 2540, code for measuring 2545, code for performing 2550, and code for outputting 2555 may cause the communications device 2500 to perform the method 2300 described with respect to FIG. 23, or any aspect related to it; and the method 2400 described with respect to FIG. 24, or any aspect related to it.

The one or more processors 2510 include circuitry configured to implement (e.g., execute) the code stored in the computer-readable medium/memory 2535, including circuitry such as circuitry for obtaining 2515, circuitry for measuring 2520, circuitry for performing 2525, and circuitry for outputting 2530. Processing with circuitry for obtaining 2515, circuitry for measuring 2520, circuitry for performing 2525, and circuitry for outputting 2530 may cause the communications device 2500 to perform the method 2300 described with respect to FIG. 23, or any aspect related to it; and the method 2400 described with respect to FIG. 24, or any aspect related to it.

Various components of the communications device 2500 may provide means for performing the method 2300 described with respect to FIG. 23, or any aspect related to it; and the method 2400 described with respect to FIG. 24, or any aspect related to it. Means for transmitting, sending or outputting for transmission may include transceivers 332 and/or antenna(s) 334 of the BS 102 illustrated in FIG. 3 and/or the transceiver 2565 and the antenna 2570 of the communications device 2500 in FIG. 25. Means for receiving or obtaining may include transceivers 332 and/or antenna(s) 334 of the BS 102 illustrated in FIG. 3 and/or the transceiver 2565 and the antenna 2570 of the communications device 2500 in FIG. 25.

Example Clauses

Implementation examples are described in the following numbered clauses:

Clause 1: A method for wireless communications at a first wireless node, comprising: obtaining a configuration indicating subband-based reference signal (RS) resources; measuring, within at least one downlink subband or at least one uplink subband in at least one subband full duplex (SBFD) symbol, at least one of a cross link interference (CLI) caused by a second wireless node or a channel between the first and second wireless nodes, wherein the measurement is based on at least one RS of the RS resources indicated in the configuration; and performing one or more actions after measuring the CLI or the channel.

Clause 2: The method of Clause 1, wherein at least one of the one or more actions comprises reporting at least one metric based on the CLI or the channel measurement.

Clause 3: The method of any one of Clauses 1-2, wherein: the measurement comprises measuring at least one CLI metric; the at least one CLI metric comprises a received signal strength indicator (RSSI) measured within the at least one uplink subband; and the measurement of the at least one CLI metric is based on a reference signal via the at least one downlink subband.

Clause 4: The method of any one of Clauses 1-3, wherein: the measurement comprises measuring at least one CLI metric; the at least one CLI metric comprises at least one of received signal strength indicator (RSSI) measured within the at least one downlink subband or RS received power (RSRP) measured within the at least one downlink subband; and the measurement of the at least one CLI metric is based on a reference signal via the at least one downlink subband.

Clause 5: The method of any one of Clauses 1-4, wherein: the measurement comprises measuring the channel within the at least one uplink subband, based on an RS output from the second wireless node in the at least one downlink subband.

Clause 6: The method of Clause 5, wherein at least one of the one or more actions comprises receiving nulling based on the measurement of the channel within the at least one uplink subband.

Clause 7: The method of any one of Clauses 1-6, wherein the measurement comprises measuring the channel within the at least one downlink subband, based on: an RS output from the second wireless node in the at least one downlink subband; or an RS output from the second wireless node across the at least one downlink subband and the at least one uplink subband.

Clause 8: The method of any one of Clauses 1-7, wherein: the measurement comprises measuring the channel within the at least one downlink subband, based on an RS output from the second wireless node in the at least one downlink subband.

Clause 9: The method of any one of Clauses 1-8, wherein the configuration further indicates a timing offset, relative to a symbol boundary, to apply when measuring the at least one of the CLI or the channel.

Clause 10: The method of any one of Clauses 1-9, wherein: the SBFD symbol is configured with at least two non-contiguous downlink subbands with at least an uplink subband and guard bands in between; and the configuration indicates separate RS resources for each of the downlink subbands, or information regarding a non-contiguous RS resource across the downlink subbands.

Clause 11: The method of Clause 10, wherein the first wireless node is configured to measure RS in only one of the downlink subbands.

Clause 12: The method of Clause 10, wherein: the information regarding the non-contiguous RS resource comprises an RS resource allocation that spans the downlink subbands; and the method further comprises deriving the non-contiguous RS resource by excluding frequency resources outside of the downlink subbands.

Clause 13: The method of any one of Clauses 1-12, wherein the first wireless node comprises a distributed unit (DU) and the configuration is obtained from a central unit (CU).

Clause 14: The method of Clause 13, wherein: the RS resources indicated in the configuration comprise channel state information RS (CSI-RS) measurement resources; and the method further comprises measuring at least one of CLI or a channel based on the CSI-RS measurement resources.

Clause 15: The method of Clause 14, wherein the configuration indicates separate CSI-RS resources for SBFD symbols and non-SBFD symbols.

Clause 16: The method of Clause 14, wherein: the configuration indicates a common CSI-RS resource for both SBFD symbols and non-SBFD symbols; and the method further comprises deriving, from the common CSI-RS resource, one or more CSI-RS resources for at least one of CLI or channel measurement for SBFD symbols.

Clause 17: The method of Clause 16, wherein: the common CSI-RS resources comprises a contiguous CSI-RS resource; and the one or more CSI-RS resources, derived from the contiguous CSI-RS resource, comprise non-contiguous CSI-RS resources.

Clause 18: The method of Clause 17, wherein the non-contiguous CSI-RS resources are derived by at least one of: excluding, from the contiguous CSI-RS resource, frequency resources outside of the at least one downlink subband; or including frequency resources within the at least one uplink subband.

Clause 19: The method of Clause 14, wherein measuring at least one of CLI or a channel in at least one non-SBFD symbol based on the CSI-RS measurement resources comprises at least one of: measuring at least one of CLI or a channel in at least one non-SBFD symbol configured as a flexible symbol; measuring at least one of CLI or a channel in at least one non-SBFD symbol configured as a downlink symbol; or measuring at least one of CLI or a channel in at least one non-SBFD symbol configured as an uplink symbol.

Clause 20: The method of Clause 14, wherein: measuring at least one of CLI or a channel in flexible symbols is based on a CSI-RS measurement resource that spans the at least one uplink subband and the at least one downlink subband.

Clause 21: The method of Clause 14, wherein: measuring at least one of CLI or a channel in flexible symbols is based on a CSI-RS measurement resource that spans the at least one uplink subband and the at least one downlink subband and a rule that allows reception of CSI-RS in a downlink symbol.

Clause 22: The method of Clause 14, wherein: measuring at least one of CLI or a channel in flexible symbols is based on a CSI-RS measurement resource that spans the at least one uplink subband and the at least one downlink subband.

Clause 23: A method for wireless communications at a second wireless node, comprising: obtaining a configuration indicating subband-based reference signal (RS) resources; outputting, within at least one downlink subband or at least one uplink subband in at least one subband full duplex (SBFD) symbol, at least one RS on the RS resources indicated by the configuration; and obtaining, from a first wireless node, a report that indicates at least one of a cross link interference (CLI) based on measurement of the at least one RS at the first wireless node, or channel measurement based on measurement of the at least one RS at the first wireless node.

Clause 24: The method of Clause 23, wherein: the RS is output via the at least one downlink subband; and the report indicates a received signal strength indicator (RSSI) measured within the at least one uplink subband.

Clause 25: The method of any one of Clauses 23-24, wherein: the RS is output via the at least one downlink subband; and the report indicates at least one of received signal strength indicator (RSSI) measured within the at least one downlink subband or RS received power (RSRP) measured within the at least one downlink subband.

Clause 26: The method of any one of Clauses 23-25, wherein: the report indicates channel measurement; and the method further comprises performing transmit nulling based on the channel measurement.

Clause 27: The method of any one of Clauses 23-26, wherein the report indicates channel measurement within the at least one downlink subband, based on: the RS output from the second wireless node in the at least one downlink subband; or the RS output from the second wireless node across the at least one downlink subband and the at least one uplink subband.

Clause 28: The method of any one of Clauses 23-27, wherein: the SBFD symbol is configured with at least two non-contiguous downlink subbands with at least an uplink subband and guard bands in between; and the configuration indicates separate RS resources for each of the downlink subbands, or information regarding a non-contiguous RS resource across the downlink subbands.

Clause 29: The method of Clause 28, wherein the second wireless node is configured to output RS in only one of the downlink subbands.

Clause 30: The method of Clause 28, wherein: the information regarding the non-contiguous RS resource comprises an RS resource allocation that spans the downlink subbands; and the method further comprises deriving the non-contiguous RS resource by excluding frequency resources outside of the downlink subbands.

Clause 31: The method of any one of Clauses 23-30, wherein the first wireless node comprises a distributed unit (DU) and the configuration is obtained from a central unit (CU).

Clause 32: The method of Clause 31, wherein: the RS resources indicated in the configuration comprise channel state information RS (CSI-RS) measurement resources.

Clause 33: The method of Clause 32, wherein the configuration indicates separate CSI-RS resources for SBFD symbols and non-SBFD symbols.

Clause 34: The method of Clause 32, wherein: the configuration indicates a common CSI-RS resource for both SBFD symbols and non-SBFD symbols; and the method further comprises deriving, from the common CSI-RS resource, one or more CSI-RS resources for at least one of CLI or channel measurement for SBFD symbols.

Clause 35: The method of Clause 34, wherein: the common CSI-RS resources comprises a contiguous CSI-RS resource; and the one or more CSI-RS resources, derived from the contiguous CSI-RS resource, comprise non-contiguous CSI-RS resources.

Clause 36: The method of Clause 35, wherein the non-contiguous CSI-RS resources are derived by at least one of: excluding, from the contiguous CSI-RS resource, frequency resources outside of the at least one downlink subband; or including frequency resources within the at least one uplink subband.

Clause 37: The method of Clause 32, wherein outputting at least one RS on the RS resources indicated by the configuration comprises at least one of: outputting the at least one RS in at least one non-SBFD symbol configured as a flexible symbol; outputting the at least one RS in at least one non-SBFD symbol configured as a downlink symbol; or outputting the at least one RS in at least one non-SBFD symbol configured as an uplink symbol.

Clause 38: The method of Clause 32, wherein: outputting the at least one RS comprises outputting CSI-RS on a CSI-RS measurement resource that spans the at least one uplink subband and the at least one downlink subband.

Clause 39: The method of Clause 32, wherein: outputting the at least one RS comprises outputting CSI-RS on a CSI-RS measurement resource that spans the at least one uplink subband and the at least one downlink subband.

Clause 40: The method of Clause 32, wherein: outputting the at least one RS comprises outputting CSI-RS on a CSI-RS measurement resource that spans the at least one uplink subband and the at least one downlink subband, based on a rule that allows outputting of CSI-RS in an uplink symbol.

Clause 41: An apparatus, comprising: at least one memory comprising executable instructions; and at least one processor configured to execute the executable instructions and cause the apparatus to perform a method in accordance with any one of Clauses 1-40.

Clause 42: An apparatus, comprising means for performing a method in accordance with any one of Clauses 1-40.

Clause 43: A non-transitory computer-readable medium comprising executable instructions that, when executed by at least one processor of an apparatus, cause the apparatus to perform a method in accordance with any one of Clauses 1-40.

Clause 44: A computer program product embodied on a computer-readable storage medium comprising code for performing a method in accordance with any one of Clauses 1-40.

Clause 45: A first network node (e.g., a network entity), comprising: at least one transceiver; at least one memory comprising executable instructions; and at least one processor configured to execute the executable instructions and cause the apparatus to perform a method in accordance with any one of Clauses 1-22, wherein the at least one transceiver is configured to receive the configuration.

Clause 46: A second network entity (e.g., a network entity), comprising: at least one transceiver; at least one memory comprising executable instructions; and at least one processor configured to execute the executable instructions and cause the apparatus to perform a method in accordance with any one of Clauses 23-40 wherein the at least one transceiver is configured to at least one of receive the configuration, transmit the RS, or receive the report.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a graphics processing unit (GPU), a neural processing unit (NPU), a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, the term wireless node may refer to, for example, a network entity or a user equipment (UE). In this context, a network entity may be a base station (e.g., a gNB) or a module (e.g., a CU, DU, and/or RU) of a disaggregated base station.

While the present disclosure may describe certain operations as being performed by one type of wireless node, the same or similar operations may also be performed by another type of wireless node. For example, operations performed by a network entity may also (or instead) be performed by a UE. Similarly, operations performed by a UE may also (or instead) be performed by a network entity.

Further, while the present disclosure may describe certain types of communications between different types of wireless nodes (e.g., between a network entity and a UE), the same or similar types of communications may occur between same types of wireless nodes (e.g., between network entities or between UEs, in a peer-to-peer scenario). Further, communications may occur in reverse direction relative to what is described (e.g., a UE could transmit a request to a network entity and the network entity transmits a response; OR a network entity could transmit the request to a UE and the UE transmits the response).

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

In some cases, rather than actually transmitting a signal, an apparatus (e.g., a wireless node or device) may have an interface to output the signal for transmission. For example, a processor may output a signal, via a bus interface, to a radio frequency (RF) front end for transmission. Accordingly, a means for outputting may include such an interface as an alternative (or in addition) to a transmitter or transceiver. Similarly, rather than actually receiving a signal, an apparatus (e.g., a wireless node or device) may have an interface to obtain a signal from another device. For example, a processor may obtain (or receive) a signal, via a bus interface, from an RF front end for reception. Accordingly, a means for obtaining may include such an interface as an alternative (or in addition) to a receiver or transceiver.

Means for obtaining, means for measuring, means for performing, and means for outputting may comprise one or more processors, such as one or more of the processors described above with reference to FIG. 25.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first network entity, comprising:

at least one transceiver;

at least one memory comprising computer-executable instructions; and one or more processors configured to execute the computer-executable instructions and cause the first network entity to:

receive, via the at least one transceiver, a configuration indicating subband-based reference signal (RS) resources;

measure, via the at least one transceiver and within at least one downlink subband or at least one uplink subband in at least one subband full duplex (SBFD) symbol, at least one of a cross link interference (CLI) caused by a second network entity or a channel between the first network entity and the second network entity, wherein the measurement is based on at least one RS of the RS resources indicated in the configuration; and perform, via the at least one transceiver, one or more actions after measuring the CLI or the channel.

2. The first network entity of claim 1, wherein the one or more actions comprise reporting at least one metric based on the CLI or the channel measurement.

3. The first network entity of claim 1, wherein;

the measurement comprises measurement of at least one CLI metric;

the at least one CLI metric comprises a received signal strength indicator (RSSI) measured within the at least one uplink subband; and the measurement of the at least one CLI metric is based on a reference signal via the at least one downlink subband.

4. The first network entity of claim 1, wherein;

the measurement comprises measurement of at least one CLI metric;

the at least one CLI metric comprises at least one of received signal strength indicator (RSSI) measured within the at least one downlink subband or RS received power (RSRP) measured within the at least one downlink subband; and the measurement of the at least one CLI metric is based on a reference signal via the at least one downlink subband.

5. The first network entity of claim 1, wherein the measurement comprises measurement of the channel within the at least one uplink subband, based on the at least one RS transmitted from the second network entity in the at least one downlink subband.

6. The first network entity of claim 5, wherein the one or more actions comprise receive nulling based on the measurement of the channel within the at least one uplink subband.

7. The first network entity of claim 1, wherein the measurement comprises measurement of the channel within the at least one downlink subband, based on the at least one RS transmitted from the second network entity across the at least one downlink subband and the at least one uplink subband.

8. The first network entity of claim 1, wherein the measurement comprises measurement of the channel within the at least one downlink subband, based on the at least one RS transmitted from the second network entity in the at least one downlink subband.

9. The first network entity of claim 1, wherein the configuration further indicates a timing offset, relative to a symbol boundary, to apply when measuring the at least one of the CLI or the channel.

10. The first network entity of claim 1, wherein:

the SBFD symbol is configured with at least two non-contiguous downlink subbands with at least an uplink subband and guard bands in between; and the configuration indicates separate RS resources for each of the downlink subbands, or information regarding a non-contiguous RS resource across the downlink subbands.

11. The first network entity of claim 10, wherein the one or more processors are further configured to cause the first network entity to measure the at least one RS in only one of the downlink subbands.

12. The first network entity of claim 10, wherein;

the information regarding the non-contiguous RS resource comprises an RS resource allocation that spans the downlink subbands; and the one or more processors are further configured to cause the first network entity to derive the non-contiguous RS resource by excluding frequency resources outside of the downlink subbands.

13. The first network entity of claim 1, wherein the first network entity is configured to operate as a distributed unit (DU) and the configuration is received from a central unit (CU).

14. The first network entity of claim 13, wherein:

the RS resources indicated in the configuration comprise channel state information RS (CSI-RS) measurement resources; and the one or more processors are further configured to cause the first network entity to measure at least one of CLI or a channel based on the CSI-RS measurement resources.

15. The first network entity of claim 14, wherein the configuration indicates separate CSI-RS resources for SBFD symbols and non-SBFD symbols.

16. The first network entity of claim 14, wherein;

the configuration indicates a common CSI-RS resource for both SBFD symbols and non-SBFD symbols; and the one or more processors are further configured to cause the first network entity to derive, from the common CSI-RS resource, one or more CSI-RS resources for at least one of CLI or channel measurement for SBFD symbols.

17. The first network entity of claim 16, wherein:

the common CSI-RS resources comprises a contiguous CSI-RS resource; and the one or more CSI-RS resources, derived from the contiguous CSI-RS resource, comprise non-contiguous CSI-RS resources.

18. The first network entity of claim 17, wherein in order to derive the non-contiguous CSI-RS resources, the one or more processors are further configured to cause the first network entity to at least one of:

exclude, from the contiguous CSI-RS resource, frequency resources outside of the at least one downlink subband; or include frequency resources within the at least one uplink subband.

19. The first network entity of claim 14, wherein measurement of at least one of CLI or a channel in at least one non-SBFD symbol based on the CSI-RS measurement resources comprises at least one of:

measurement of at least one of CLI or a channel in at least one non-SBFD symbol configured as a flexible symbol;

measurement of at least one of CLI or a channel in at least one non-SBFD symbol configured as a downlink symbol; or measurement of at least one of CLI or a channel in at least one non-SBFD symbol configured as an uplink symbol.

20. The first network entity of claim 14, wherein measurement of at least one of CLI or a channel in flexible symbols is based on a CSI-RS measurement resource that spans the at least one uplink subband and the at least one downlink subband.

21. The first network entity of claim 14, wherein measurement of at least one of CLI or a channel in flexible symbols is based on a CSI-RS measurement resource that spans the at least one uplink subband and the at least one downlink subband and a rule that allows reception of CSI-RS in a downlink symbol.

22. An apparatus for wireless communication, comprising:

at least one transceiver;

at least one memory comprising computer-executable instructions; and one or more processors configured to execute the computer-executable instructions and cause the apparatus to:

receive, via the at least one transceiver, a configuration indicating subband-based reference signal (RS) resources;

transmit, via the at least one transceiver and within at least one downlink subband or at least one uplink subband in at least one subband full duplex (SBFD) symbol, at least one RS on the subband-based RS resources indicated by the configuration; and receive, from a network entity via the at least one transceiver, a report that indicates at least one of a cross link interference (CLI) based on measurement of the at least one RS at the network entity, or channel measurement based on measurement of the at least one RS at the network entity.

23. The apparatus of claim 22, wherein:

the RS is transmitted via the at least one downlink subband; and the report indicates a received signal strength indicator (RSSI) measured within the at least one uplink subband.

24. The apparatus of claim 22, wherein:

the RS is transmitted via the at least one downlink subband; and the report indicates at least one of received signal strength indicator (RSSI) measured within the at least one downlink subband or RS received power (RSRP) measured within the at least one downlink subband.

25. The apparatus of claim 22, wherein:

the report indicates channel measurement; and the one or more processors are further configured to cause the apparatus to perform transmit nulling, via the at least one transceiver, based on the channel measurement.

26. The apparatus of claim 22, wherein the report indicates channel measurement within the at least one downlink subband, based on:

the RS transmitted from the apparatus in the at least one downlink subband; or the RS transmitted from the apparatus across the at least one downlink subband and the at least one uplink subband.

27. The apparatus of claim 22, wherein:

the SBFD symbol is configured with at least two non-contiguous downlink subbands with at least an uplink subband and guard bands in between; and the configuration indicates separate RS resources for each of the downlink subbands, or information regarding a non-contiguous RS resource across the downlink subbands.

28. The apparatus of claim 27, wherein the at least one RS is transmitted in only one of the downlink subbands.

29. The apparatus of claim 27, wherein:

the information regarding the non-contiguous RS resource comprises an RS resource allocation that spans the downlink subbands; and the one or more processors are further configured to cause the apparatus to derive the non-contiguous RS resource by excluding frequency resources outside of the downlink subbands.

30. The apparatus of claim 22, wherein the apparatus is configured to operate as a distributed unit (DU) and the configuration is received from a central unit (CU).

31. The apparatus of claim 30, wherein the RS resources indicated in the configuration comprise channel state information RS (CSI-RS) measurement resources.

32. The apparatus of claim 31, wherein the configuration indicates separate CSI-RS resources for SBFD symbols and non-SBFD symbols.

33. The apparatus of claim 31, wherein:

the configuration indicates a common CSI-RS resource for both SBFD symbols and non-SBFD symbols; and the one or more processors are further configured to cause the apparatus to derive, from the common CSI-RS resource, one or more CSI-RS resources for at least one of CLI or channel measurement for SBFD symbols.

34. The apparatus of claim 33, wherein:

the common CSI-RS resources comprises a contiguous CSI-RS resource; and the one or more CSI-RS resources, derived from the contiguous CSI-RS resource, comprise non-contiguous CSI-RS resources.

35. The apparatus of claim 34, wherein in order to derive the non-contiguous CSI-RS resources, the one or more processors are further configured to cause the apparatus to at least one of:

exclude, from the contiguous CSI-RS resource, frequency resources outside of the at least one downlink subband; or include frequency resources within the at least one uplink subband.

36. The apparatus of claim 31, wherein in order to transmit at least one RS on the RS resources indicated by the configuration, the one or more processors are further configured to cause the apparatus to at least one of:

transmit, via the at least one transceiver, the at least one RS in at least one non-SBFD symbol configured as a flexible symbol;

transmit, via the at least one transceiver, the at least one RS in at least one non-SBFD symbol configured as a downlink symbol; or transmit, via the at least one transceiver, the at least one RS in at least one non-SBFD symbol configured as an uplink symbol.

37. The apparatus of claim 31, wherein in order to transmit the at least one RS, the one or more processors are further configured to cause the apparatus to transmit CSI-RS on a CSI-RS measurement resource that spans the at least one uplink subband and the at least one downlink subband.

38. The apparatus of claim 31, wherein in order to transmit the at least one RS, the one or more processors are further configured to cause the apparatus to transmit CSI-RS on a CSI-RS measurement resource that spans the at least one uplink subband and the at least one downlink subband, based on a rule that allows transmission of CSI-RS in an uplink symbol.

39. The apparatus of claim 22, wherein the apparatus is configured to operate as another network entity.

40. A method for wireless communications by a first network entity, comprising:

receiving a configuration indicating subband-based reference signal (RS) resources;

measuring, within at least one downlink subband or at least one uplink subband in at least one subband full duplex (SBFD) symbol, at least one of a cross link interference (CLI) caused by a second network entity or a channel between the first network entity and the second network entity, wherein the measurement is based on at least one RS of the RS resources indicated in the configuration; and performing one or more actions after measuring the CLI or the channel.

* * * * *